Feb. 2, 1960 V. M. CORRADO ET AL 2,923,215
PHOTOTYPOGRAPHICAL MACHINE
Filed Nov. 14, 1957 13 Sheets-Sheet 1
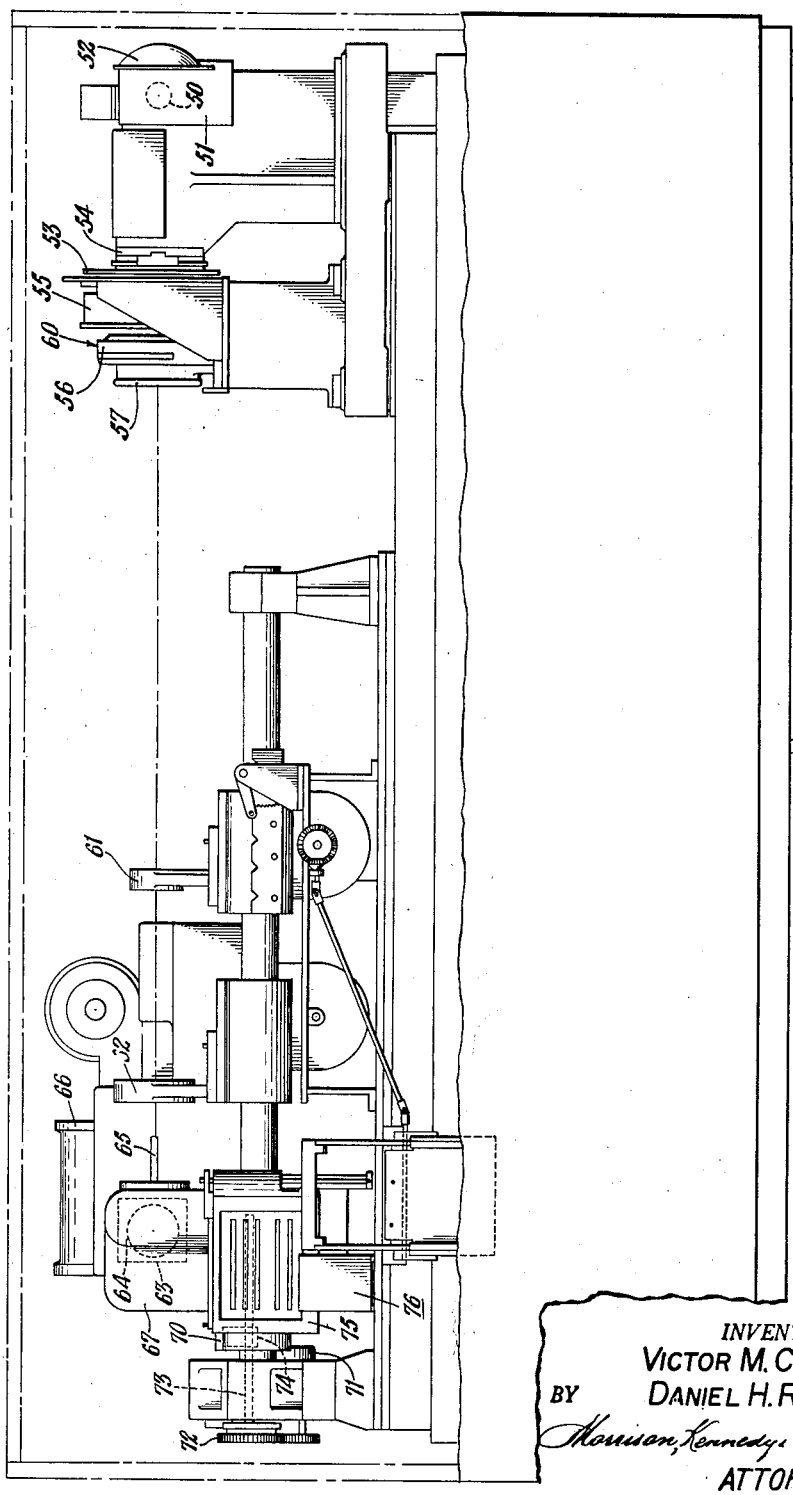
INVENTORS
VICTOR M. CORRADO
DANIEL H. ROBBINS
BY
*Morrison, Kennedy & Campbell*
ATTORNEYS Feb. 2, 1960 V. M. CORRADO ET AL 2,923,215
PHOTOTYPOGRAPHICAL MACHINE
Filed Nov. 14, 1957 13 Sheets-Sheet 2

INVENTORS
VICTOR M. CORRADO
DANIEL H. ROBBINS
BY
*Morrison, Kennedy & Campbell*
ATTORNEYS

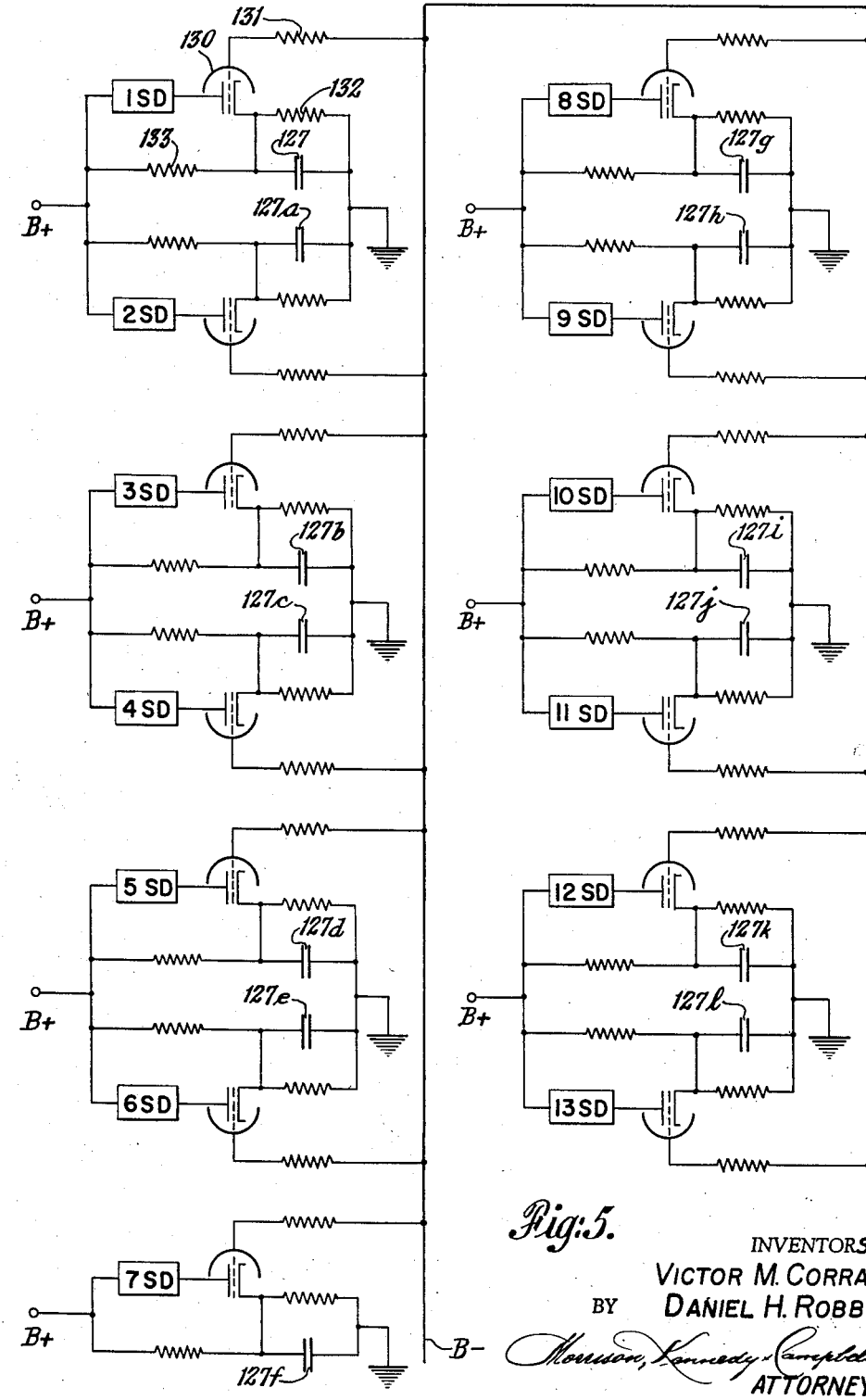

Feb. 2, 1960  V. M. CORRADO ET AL  2,923,215
PHOTOTYPOGRAPHICAL MACHINE
Filed Nov. 14, 1957  13 Sheets-Sheet 12
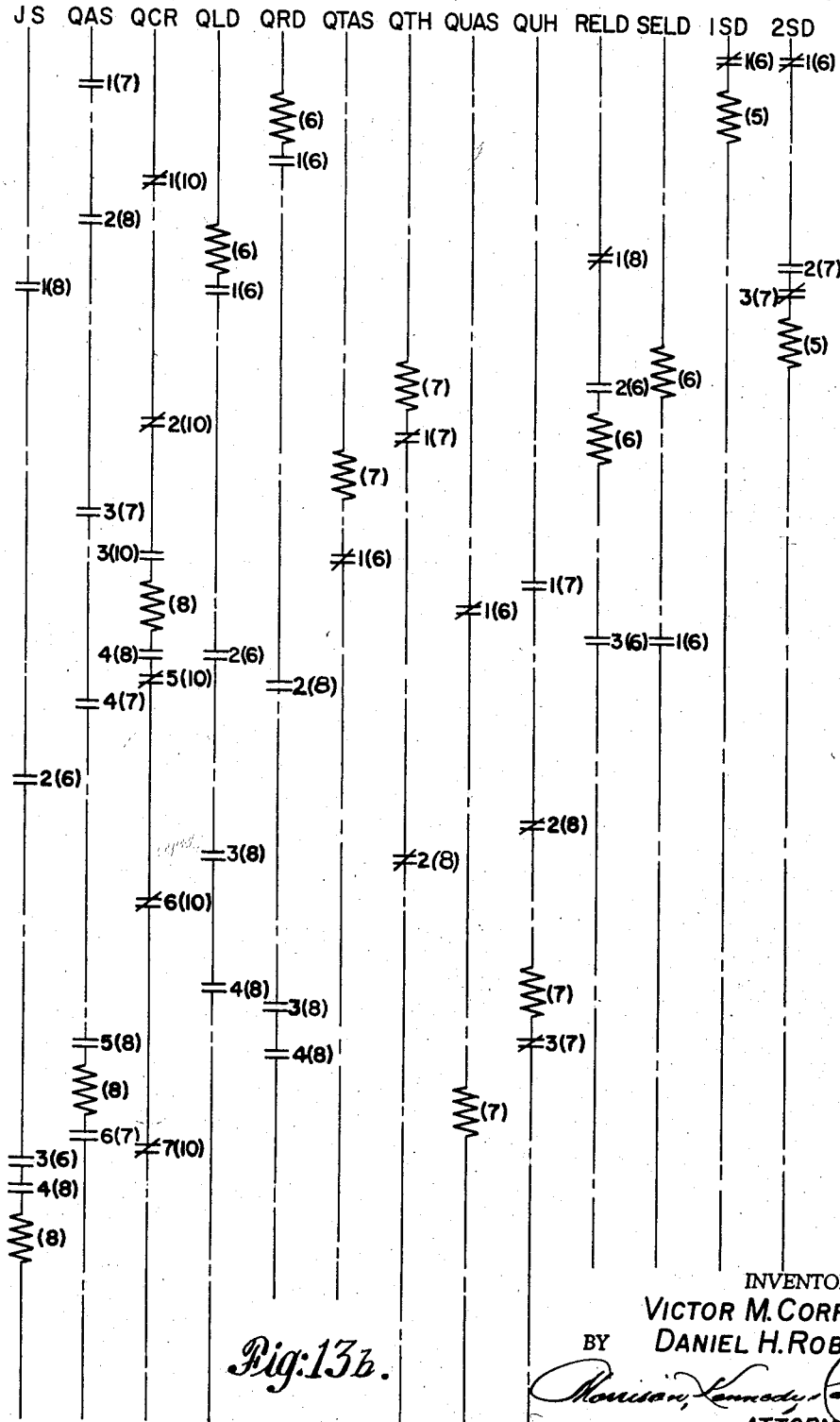
Fig:13b.
INVENTORS
VICTOR M. CORRADO
BY  DANIEL H. ROBBINS
ATTORNEYS Feb. 2, 1960 V. M. CORRADO ET AL 2,923,215
PHOTOTYPOGRAPHICAL MACHINE
Filed Nov. 14, 1957 13 Sheets-Sheet 13
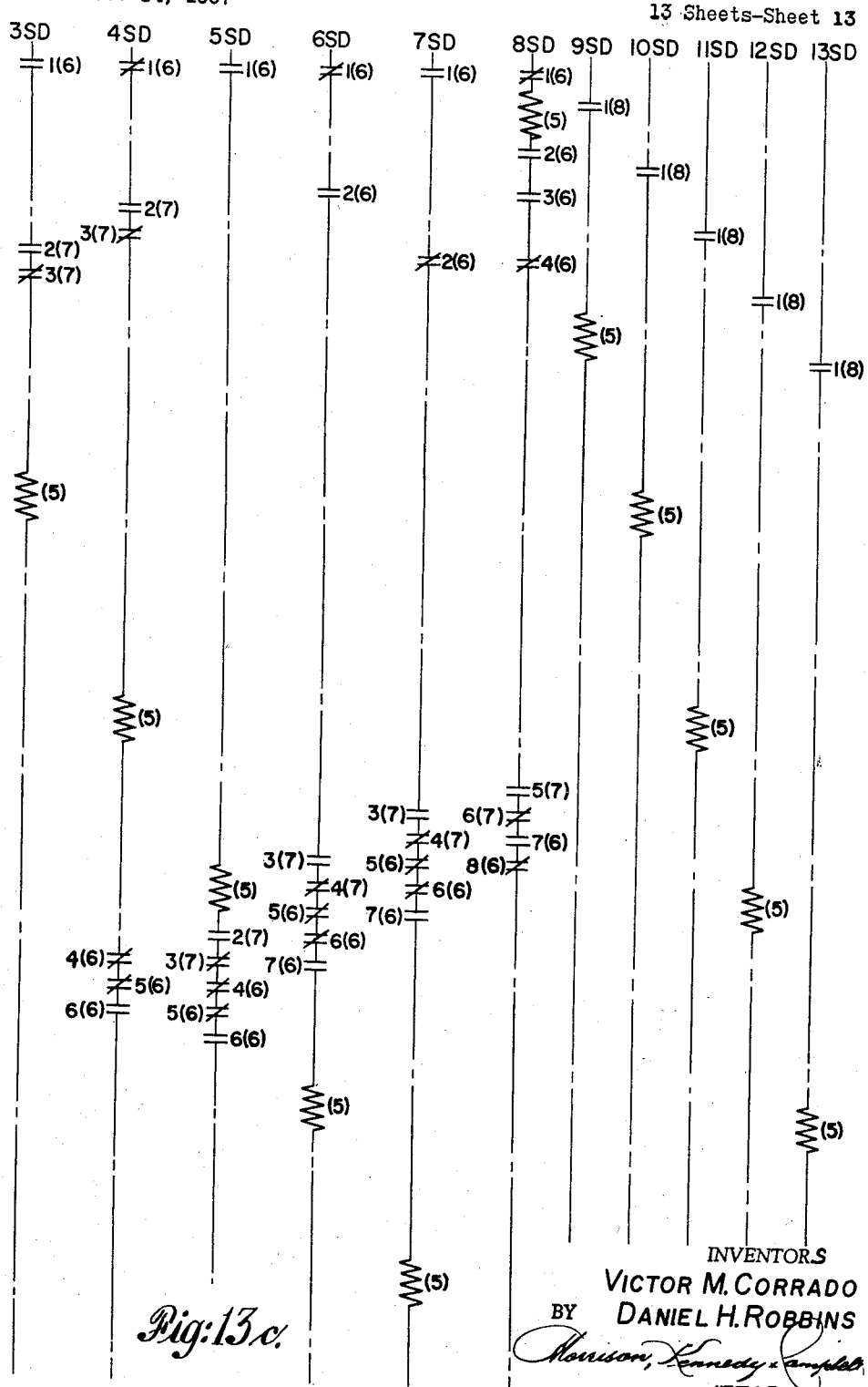
Fig:13c.
INVENTORS
VICTOR M. CORRADO
DANIEL H. ROBBINS
BY
ATTORNEYS

United States Patent Office 2,923,215
Patented Feb. 2, 1960

2,923,215
PHOTOTYPOGRAPHICAL MACHINE

Victor M. Corrado, Williston Park, and Daniel H. Robbins, Bronxville, N.Y., assignors to Mergenthaler Linotype Company, a corporation of New York Application November 14, 1957, Serial No. 696,448

58 Claims. (Cl. 95—4.5)

This invention relates to a phototypographical machine and particularly to a tape operated machine of the general organization disclosed in U.S. applications for Letters Patent Serial No. 419,012, filed March 26, 1954, and Serial No. 422,526 filed April 12, 1954, now Patent No. 2,816,609, wherein characters are photographed one after another on a strip of sensitized film or paper for line composition as a relative movement takes place between the sensitized film or paper and the position to which character images are projected.

In a machine of the type therein disclosed, a font plate having an array of transparent characters which vary in set widths on a unit basis is interposed between a source of light and a shutter mechanism which serves to selectively expose the various characters. In operation, the shutter mechanism is actuated to expose a character selected to be photographed and the light source is then rendered operative to project light through the character to a lenslet individual to the character. The lenslet forms the light which passes therethrough into a bundle of collimated rays and these impinge on an imaging lens common to all the lenslets. The imaging lens, in turn, serves to form, in space, and on its optical axis, an image of the selected character. A point size changing lens system is provided comprising two eye piece lenses whose combined function is to vary the size or magnification of the selected character as it is finally recorded on the sensitized film or paper. The eye piece lenses also serve to transmit the light forming the image in space as a bundle of collimated light rays to a mirror carried by a carriage that continuously traverses the sensitized film during the composition of a line, the film remaining stationary during composition. The mirror deflects the bundle of light rays at an angle of 90° and directs it to a further lens system which is also mounted on the moving carriage and which serves to decollimate the light rays and project them onto the stationary light sensitive film to form an image of the selected character in a point size controlled by the setting of the eye piece lenses.

The operation of the machine is controlled by means of a coded tape. Each character to be photographed is represented on the tape by a code signal which may be thought of as comprising two portions, one of which identifies the character and controls the operation of the shutter mechanism to selectively expose the character to be photographed, and the other portion of which represents the unit set width of the character and is transmitted to an electronic counter. An opaque grid plate, having a row of transparent slits spaced apart in units of an em of the point size of the photographed characters, is secured to the carriage for movement therewith and traverses a light beam extending from a light source to a photocell in such a manner as to transmit the light beam to the photocell for each unit of an em travelled by the carriage. The resulting pulses from the photocell are transmitted to the electronic counter. When the number of pulses from the photocell correspond with the numerical value of the unit width of the character transmitted to the counter by the code signal on the tape, the counter generates an output pulse which momentarily flashes the source of light behind the font plate to thus photograph the selected character onto the light sensitive film.

While the foregoing depicts the mode of operation of the machine to photograph the individual charatcers to be recorded, it is understood that, for a composed line of next, additional information must be provided and acted upon. Thus, the above mentioned application Serial No. 419,012 discloses that, following a series of signals representing the characters to be included in a line of text material, a justification signal and answer therefor also appear on the tape. The answer representing number of unit spaces which must be inserted between each word in the line of text is stored in a memory device and when a space signal is read on the tape after the last character in a word, the answer is transmitted to the counter so that when the number of pulses from the photocell corresponds with the numerical value of the justification answer, the counter generates an output pulse which indicates that a space of the proper width has been provided. Thereafter, the first character of the next succeeding word is photographed in the manner heretofore described. Each word space signal encountered in the tape produces a similar operation with the result that a justified line obtains after all of the individual characters therein are photographed.

Another line composing operation described in application Serial No. 419,012 is that of quadding left, or photographing the line flush with the left hand margin as in the last line of a paragraph. Under such circumstances, each time a word space signal is decoded in the tape, a numerical value corresponding to a standard or normal word space is transmitted to the counter. Then when the number of pulses from the photocell equals such value, a counter output is generated which indicates that a space of the proper width has been provided on the sensitized sheet.

While, in general, the photocomposing machine of the aforementioned application is satisfactory, and the principal types of line composing operations have been provided for as above indicated, it is noted that no provision is made for centering a line of photographed characters between the left hand and right hand margins nor is provision made for quadding right, that is, photographing the line flush with the right hand margin.

In accordance with the present invention, there is provided means for decoding an end of line signal, whether it represents a justification, centering, quad right or quad left control function, and its associated answer. The answers are stored in appropriate memory devices preparatory to the line composing movement of the projection lens carriage, and as such composing movement occurs, the answer which controls line composition is transmitted to the memory storage of an electronic comparator unit. The pulses which are generated by the photocell unit as a result of the line composing movement of the carriage are transmitted to the counter stages of the electronic comparator unit so that when there is coincidence between the stored answer signal and the pulse count, an output signal is generated by the comparator unit which effects a control to cover the line to be photographed in accordance with the end of line signal.

Features and advantages of this invention may be gained from the foregoing and the description of a preferred embodiment thereof which follows.

In the drawings:

Fig. 1 is a front elevational view showing the general organization of the photographic unit of a two unit photocomposing machine;

Fig. 5 is an electrical diagram of the scan head decoding circuitry;

Figs. 13a, 13b and 13c are spindle sheets which aid in locating the relay coils and contacts employed in the circuitry of the present apparatus.

Figure 3:
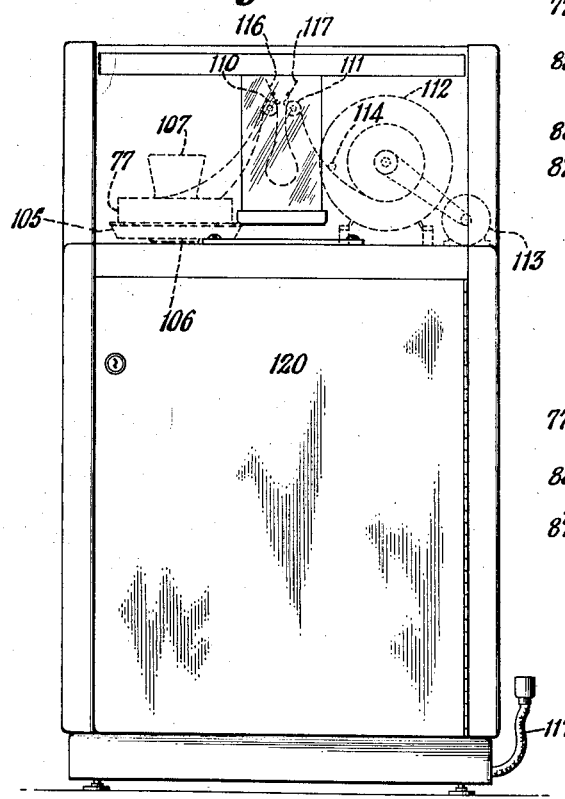
Fig. 3 is a front elevational view showing the tape decoding console unit.

In Fig. 1 there is shown a photocomposing machine similar to the one disclosed in the aforementioned application Serial No. 419,012 but more specifically embodying the improvements of the present invention. A source of light 50 is shown mounted within housing 51, as is reflector 52 which serves to concentrate and intensify the light energy in a direction forward of the source. The light is then distributed relatively evenly over the area of a font plate 53 by a condensing lens system 54, the font plate having an entire array of transparent characters arranged thereon against an opaque background. The set widths of the several characters vary one from another on a units-of-an-em basis. That is, the typographical em is divided into a finite number of equal parts or units and each character is assigned a width of so many units. The present system is based on an eighteen unit em, although it could have been based on an em comprising more or less units depending on the degree of typographic refinement desired. An eighteen unit system has been found to be entirely satisfactory.

A shutter mechanism 55 is next provided whereby the light passing through a single character selected for reproduction will be transmitted to succeeding machine components. Located forward of the shutter mechanism, within housing 56, is a lenslet array 57 which includes an individual lenslet for each character of the font. The lenslets and the font plate are disposed relative to each other such that light passing through a selected character is collimated by the associated lenslet. A single imaging lens 60, common to all of the lenslets of array 57, is provided within the housing 56, the lens 60 serving to form an image, in space and on its optical axis, of a selected character. The position of the image along the optical axis is determined by the location of an eyepiece objective lens 61. The light transmitted through the lens 61 is next collimated by a second eyepiece lens 62 and thereafter reflected by mirror 63 to projection lens system 64 which reimages the character on a sensitized film 65 provided in film magazine 66. The mirror 63 and lens system 64 are located within a housing 67 supported by a carriage 70 which is mounted for reciprocatory motion before the sensitized film to effect the character-by-character composition of a line.

In a machine as herein contemplated, the carriage is driven at a continuous speed by the reversible motor 71, the drive mechanism being the spur gear unit 72 and lead screw 73 which is threaded into the follower block 74 secured to the underside of the carriage. Since the carriage traverses the stationary film continuously (rather than in intermittent steps of a degree depending on the width of the photographed characters), there is provided means for determining at which point of carriage travel a character is to be photographed. Such means include the grating or grid plate 75 which depends from one side of the carriage so as to be translated therewith. The grid plate, which cooperates with a stationary photocell unit 76 comprising a light source and a photocell tube, itself includes a plurality of rows of transparent slits equally spaced on an opaque background. For a detailed discussion of the photocell unit and grid plate, see copending applications Serial Nos. 696,446 and 696,419 both filed simultaneously herewith. The leading edge (considering the direction of travel of the grating) of each slit in a selected row is spaced from the corresponding point of the preceding slit by a distance equal to a unit-of-an-em of the point size for which the row is provided. Each row of slits corresponds to a particular point size which can be reproduced in the machine. Thus by way of example, the six rows of slits illustrated represent the point sizes 5, 5½, 6, 7, 8 and 9 reading from top to bottom, respectively. For a means to bring a selected row of slits automatically into cooperative relation with the photocell unit in response to code signals on coded control tape, see copending application Serial No. 624,136 filed November 23, 1956. In operation, as the grating traverses the light beam of the photocell unit, the photocell is energized or pulsed by a beam of light for each unit of an em travelled by the grid plate and hence the carriage.

Figure 2:
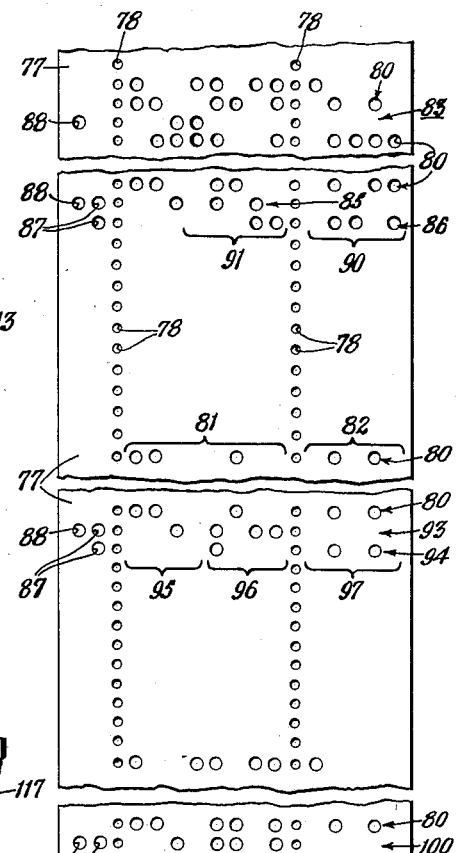
Fig. 2 is a view showing a repreesntative portion of the coded tape which controls operation of the photographic unit.

As hereinabove noted, the operation of the photographic unit is under the control of a coded tape. This tape 77 is shown in Fig. 2 and the perforations 78 are feed holes for advancing the tape through the machine.

The character signals on the tape are generally indicated by reference numeral 80. Each signal 80 is further divided into two parts, one of which occupies that portion of the tape marked 81 and identifies the character, while the second of which occupies that portion of the tape marked 82 and gives the character width. Of course, the combination of perforations in portion 81 of the tape will differ from one character to another, since the character identity part of the signal is unique for each character. The combination of perforations in portion 82 of the tape will many times be the same for different characters since such characters will have a set width of the same value. In a group of signals representing a line of text, the sub-grouping of the character signals that make up the words in a line will be separated by a space signal such as is shown by numeral 83.

Furthermore, each group of signals representing a line will be followed by an end-of-line signal 85 which controls the manner in which the characters making up the line are to be composed. That is, the signal will determine and control whether the line is to be photographed as a justified line, a centered line, a quadded right line, or a quadded left line. This signal 85 is a justification signal which will control the photographic unit so that the characters represented by the preceding signals will be photographed as a justified line. Inasmuch as this requires data as to the justified width of the word spaces appearing in the line, the justification signal is immediately followed by a justification answer signal 86 which comprises two bits of information, or parts 90 and 91, the part 90 defining the quotient and the other part 91 defining the quotient remainder. The method and means of coding of this information, as well as a definition thereof, will be found described in copending application Serial No. 607,952 filed September 4, 1956, now Patent No. 2,848,049.

Signal 92 is a quad left signal and it will control operation of the machine so that the line of characters represented by the signals preceding it on the tape will be photographed flush with the left hand margin. The spacing between words in such case (as in all lines which are to be quadded or centered) is normal or standard width and does not vary regardless of the line length or white space in the line. Thus, the quad left signal need not be followed by an answer signal which controls the interword space. Furthermore, since the direction of line composition is from left to right, or from the left hand margin, the first character in a quadded left line is photographed without the interposition of white space between itself and the left hand margin. Consequently, no answer indicative of white space is required. Therefore, the quad left signal appears alone, without any following answer signal, after the signals representing the line to be quadded left.

Signal 93 is a quad right signal and it will control operation of the machine so that the line of characters represented by the signals preceding it on the tape will be photographed flush with the right hand margin. As noted in the preceding paragraph, the spacing between words is fixed at a normal or standard value. However, since the white space in a quadded right line appears adjacent the left hand margin and before the first character to be photographed during the line composing movement, and since the amount of white space may vary from one quadded right line to another depending on the space occupied by the characters in the line, an answer signal will follow the quad right signal. This answer signal, which is assigned the reference numeral 94, will control the amount of carriage movement prior to photographing of the first character so that the last character in the line will be photographed flush with the right hand margin. The signal is shown as comprising three parts or bits of information, namely, quad ems tens, quad ems units and units-of-an-em remainder, and these are designated 95, 96 and 97 respectively in Fig. 2. The significance of these terms is explained in aforementioned application Serial No. 607,952.

The last end of line signal to be considered herein is a centering signal 100 which controls operation of the machine so that the line of characters represented by the signals preceding it on the tape will be photographed midway between the left hand and right hand margins. As heretofore noted, the interword spacings in a centered line are fixed at a normal or standard value. However, since in a centered line, one half of the white space in the line appears adjacent the left hand margin and before the first character to be photographed during the line composing movement, and since the amount of white space may vary from one centered line to another, an answer signal 101 will follow the centering signal. Such signal will control the amount of carriage movement prior to the photographing of the first character in the line so that the finally photographed line will be centered. Signal 101, similar to the quad right answer signal, comprises three parts or bits of information, namely, centering ens tens, centering ens units and units-of-an-em remainder, and these are designated 102, 103 and 104, respectively, in the representation of the coded tape. As in the case of quad right answer information, the significance of these terms will be understood by reference to application Serial No. 607,952.

It will be noted that a perforation marked 88 is placed alongside the space signal. When decoded this signal indicates that the signal in line therewith is a function signal that is to be decoded at the read head. A similar perforation is provided alongside the justification signal, the quad right signal, the centering signal, and the quad left signal, thereby indicating that each of these signals is a function signal that is to be decoded at the read head. In each case the function may be defined as the end-of-line function. It will be observed that each of these signals also has placed adjacent thereto, a perforation 87 which indicates that the signal also is to be decoded at the scan head. To summarize, a function signal, as distinct from a character signal, is provided with an auxiliary "signal" which determines the decoding head that is to decode the signal.

Having described the coded control tape and the information carried thereby for transmission to the photographic unit as well as the photocell unit and grating for measuring the amount of travel of the carriage, it remains to be described how the two cooperate with each other and the mechanism through which such cooperation or co-action is effected. However, before proceeding to such description, attention is directed to Fig. 3 wherein is shown the control tape reading or decoding console unit. This will be described briefly and, so far as function is concerned, only by way of review inasmuch as the tape decoding unit shown in aforementioned application Serial No. 419,012 performs the identical function as the present console unit, but there it was made an integral part of the photographic unit.

The coded control tape is delivered from the keyboard unit perforator as a coiled strip or roll with the signals representing the first line keyboarded, and hence the first line to be photographed, on the inside of the coil. To eliminate the necessity of rewinding the coil, the entire strip is laid horizontally on the turntable 105 which is freely rotatable on shaft 106. A center spindle 107 insures that the coded tape does not become tangled as it is fed to the decoding heads. The tape is first trained over the scan head 110 and then permitted to hang in a festoon fashion before being trained over the reading head 111. The tape is next fed to a take-up reel 112 which is driven intermittently by the motor 113, the on-off control being effected by a floating follower 114 which rests atop the tape as it is stepped past the reading head. When the tape extends between the reading head and the take-up reel in a long, deep catenary arc, the follower is thereby permitted to fall and thus energize motor 113 to wind the tape onto take-up reel 112. When the tape becomes rather taut so that the follower is elevated to a raised position, the motor is deenergized to prevent tearing of the tape. Since the drive motor for the take-up reel is deenergized, as the tape is advanced over the reading head it again assumes a long, deep catenary arc position so that the take-up or winding function of reel 112 is repeated. A plurality of feeler fingers 115 for decoding tape signals at the scanning head are provided, as are similar fingers 116 for decoding tape signals at the reading head. Decoding action of the various fingers actuates electric contacts which in turn control operation of various machine components in the photographic unit. An electric cable 117 is provided for electrically interconnecting the tape decoding console 120 and the photographic unit.

The feeler fingers 116 comprise a plurality of levers 121, one for each code station or perforation that may go to make up a control tape signal, which are pivotally disposed on a rod 122 that is supported in the frame 123. At the lower end of each lever is a rotatable star wheel 124 having a plurality of radially projecting pins 125 placed around its circumference. If a projecting pin engages a perforation in the control tape so that the pin falls through the tape the lever is thereby permitted to pivot clockwise under the pull of tension spring 126. When lever 121 is so moved, electrical contacts 127 engage to control the electrical circuitry responsive to the control tape signals.

It will be recalled, by reference to aforementioned application Serial No. 419,012, that translation or movement of the control tape through decoding units 110 and 111 is governed by the signals appearing on the tape itself. Thus, the leading edge of the tape is provided with an end-of-line signal preceding the signals representing the characters composing the first line of text. It will be noted now that each of the line composing control signals, i.e., the justification, quad left, centering and quad right signals, is considered as an end-of-line signal generally. Therefore, when the term "end-of-line signal" is used, is will be understood that one of the line composing control signals is involved and it is being utilized for a general purpose rather than for its specific function.

Following the group of signals representing the first line of text there is, of course, an end-of-line signal and its associated answer signal (except when the end-of-line signal is a quad left signal, in which case there is no answer signal) which determines the manner in which the line will be photographed. Continuing along the tape, and at a fixed predetermined distance from the end-of-line signal for the first line of text, is a signal representing the first character in the next succeeding line of text. After the group of signals representing the second line of text are the appropriate end-of-line and answer signals. One group of signals thus succeeds a prior group of signals, each of which represents a line of text and each of which is started at a fixed predetermined distance from the end-of-line signal for the preceding signal group. The fixed distance is determined by the spacing between scanning head 110 and reading head 111 and it is sufficient to permit two successive end-of-line signals to be in reading position on the scanning and reading heads, respectively, even when only a single character signal is coded on the tape between the two signals.

The tape is placed on the decoding heads with the initial end-of-line signal or reading head 111 and the next end-of-line signal on scanning head 110. With the tape so located, the group of character signals representing the first line of text are on that portion of the tape extending between the two heads.

The simultaneous decoding of end-of-line signals on both decoding heads is interpreted by the machine as a signal to rotate the scan head one position to bring the answer signal into decoding position. The mechanism for actuating the scan and read heads will not be described in detail inasmuch as it is not germane to the present invention; however, it will be observed that the coordinated movement of the control tape is the same as in the machine disclosed in application Serial No. 419,012. After the answer is decoded and appropriately stored in memory devices in the machine, the photographic composition of the line takes place. Simultaneously with initiation of photography, the scan head is actuated to bring the next end-of-line signal to decoding position thereon at which time advance of the tape over the scan head is arrested. In the meantime, composition of the first line is proceeding. After the last character in the line is photographed, the end-of-line signal is decoded at the reading head and, in response thereto, the direction of travel of carriage 70 is reversed to restore the carriage to its start of line position and the sensitized sheet is advanced lengthwise in the film magazine to bring an unexposed portion thereof to a position to receive images of the next line of characters.

Furthermore, since there is again an end-of-line signal in decoding position on both scan head 110 and read head 111, the operations above outlined are repeated. This process continues and is repeated until the entire tape is decoded.

Inasmuch as the present invention is concerned principally with control of the photographing of the individual character images in such manner that they are composed in lines which are justified, quadded left, quadded right or centered, the apparatus to be disclosed is electrical or electronic in nature and will be made known principally through wiring diagrams.

Figs. 5 to 12 show the electrical and electronic circuits employed to decode the end-of-line signals in the tape and to control photographing of the individual character images relative to the movement of projection lens carriage 70 so that the character images appear on justified, quadded left, quadded right or centered lines. The relay or electrical circuits are shown in "straight" or "across-the-line" form in which the contacts of a relay are shown separated from the relay coil which operates them and arranged in the circuits which they control. To facilitate locating contacts and relay coils referred to in the specification, there are provided a number of key or "spindle" sheets. On these sheets (Figs. 13a to 13c), a vertical spindle is provided for each relay used in the electrical system. The spindles are identified by the relay designation for the relay associated therewith, the designations being arranged alphabetically across the top of the sheets. On each spindle, there is located representations of the relay coil and the relay contacts. The figure in which a coil or contact is to be found is indicated parenthetically next to the coil or contact. In order to locate a contact on the straight wiring diagram, it is merely necessary to place the spindle sheet containing the sought-after coil or contact alongside the figure indicated parenthetically next to such coil or contact, whereupon the coil or contact on the straight wiring diagram will be found in horizontal alignment with the coil or contact on the spindle sheet. For example, to locate contact BT4, take the spindle sheet containing this contact, namely, Fig. 13a, locate the contact thereon and determine the figure in which contact BT4 appears. This is indicated by the numeral in parenthesis next to the contact representation. Place the spindle sheet (Fig. 13a) next to the sheet containing Fig. 10 and contact BT4 will be in approximate horizontal alignement with the contact on the spindle sheet.

In the straight wiring diagram the following electromagnetic relays will be found:

AO—Add one relay
BE—Binary eight relay
BF—Binary four relay
BO—Binary one relay
BS—Binary sixteen relay
BT—Binary two relay
CD—Center decode relay
ELG—End-of-line gate relay
EMS—Quad ems relay
ENS—Center ens relay
FCP—First character pulse relay
JAS—Justification answer stored relay
JD—Justification decode relay
JS—Justification answer search relay
QAS—Quad answer search relay
QCR—Quad and Center relay
QLD—Quad left decode
QRD—Quad right decode
QTAS—Quad ems tens answer relay
QTH—Quad tens stepper home relay
QUAS—Quad ems units answer relay
QUH—Quad units stepper home relay
RELD—Read end-of-line relay
1SD—First scan decode relay
2SD—Second scan decode relay
3SD—Third scan decode relay
4SD—Fourth scan decode relay
5SD—Fifth scan decode relay
6SD—Sixth scan decode relay
7SD—Seventh scan decode relay
8SD—Eighth scan decode relay
9SD—Ninth scan decode relay
10SD—Tenth scan decode relay
11SD—Eleventh scan decode relay
12SD—Twelfth scan decode relay
13SD—Thirteenth scan decode relay
SELD—Scan end-of-line relay Throughout the description which follows, these letters will be applied to the coils of the above designated relays. Also, with reference numerals appended thereto, they will be applied to the contacts of the designated relays. The contacts are shown with relay coils deenergized.

In addition to the above listed electromagntic relays, the following three stepping switches are shown in the wiring diagram.

JST—Justification stepping switch
QTST—Quad ems tens stepping switch
QUST—Quad ems units stepping switch In the description of the circuitry, these letters will be applied to the coils which are energized to step the switches. Since each of the stepping switches employed is a multi-level switch having several rows or levels of contacts each engaged by a movable brush, the brushes on a single switch will be differentiated one from another by suffix numerals, e. g. JB1, JB2. The contacts engaged by brush JB1 will be designated JC1-H, JC1-25, JC1-24 etc., while those contacts engaged by brush JB2 will be designated JC2-H, JC2-25, JC2-24 etc. Other brushes and contacts will be designated similarly.

Figure 4:
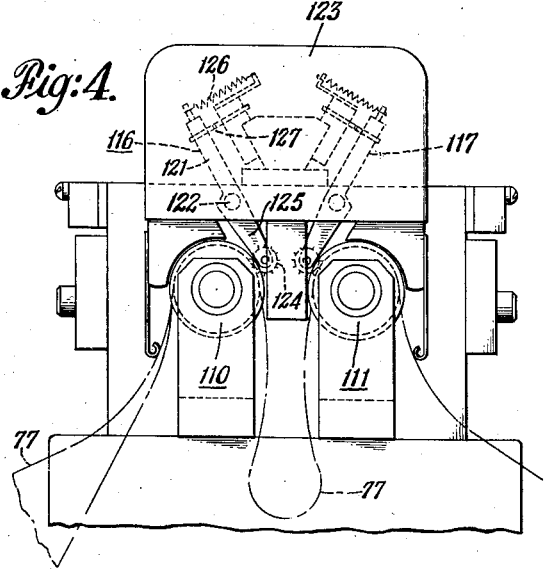
Fig. 4 is an enlarged elevational view showing the tape decoding mechanisms.

In Fig. 5 is shown the circuitry for decoding of the control tape signals on the scanning head 110. Each of contacts 127, 127a, 127b, 127c, etc., is engaged when the lever e. g. 121 (Fig. 4) associated therewith is pivoted clockwise as by a star wheel pin e. g. 125 engaging a perforated portion of control tape 77. From Fig. 5 it is clear that there are a minimum of thirteen code stations at the scan head. Since in the present application we are concerned only with the decoding of end-of-line signals and the answers therefor, this means that thirteen code stations are sufficient for the coding of this information. Other code stations generally will be provided, but these fulfill functions other than that of decoding end-of-line signals and answers, and hence they will not be considered.

Since all of the decoding circuits are similar, only the operating circuit for the first scan head decode relay 1SD will be described in detail. The relay coil 1SD is connected in the plate circuit of triode tube 130. A fixed bias is placed on the grid of the tube by means of grid resistor 131 connected between the negative voltage power supply and the grid. The tube cathode is connected to ground through the cathode resistor 132. In addition the cathode is connected to the B+ power supply through resistor 133. By properly proportioning resistors 133 and 132, the plate-cathode voltage is insufficient to cause conduction in tube 130 with the fixed grid bias established by resistor 131. However, when contacts 127 engage to short out resistor 132, the plate-cathode voltage jumps to the B+ value and immediately the tube starts to conduct, thereby energizing coil 1SD and actuating the relay. Separation of contacts 127 reduces the plate-cathode voltage and thereby cuts off conduction in tube 130 to deenergize coil 1SD and restore the relay and its contacts to their normal condition.

It is, of course, clear that the circuits for coils 2SD, 3SD etc. function in the same manner and that a combination of relays will generally be actuated when a control tape signal is decoded.

*Justification*

Reference is now made to Figs. 5, 6, 7 and 8 and it is assumed that an end-of-line signal is in decoding position on both the scan head 110 and the read head 111. For purposes of the present discussion, it is further assumed that the end-of-line signal on the scan head is a justification signal, it being immaterial what the nature of the signal on the read head is since that signal performs only a generalized function. From the foregoing description, it will be appreciated that an answer signal follows the justification signal and that the signal comprises a quotient answer and a quotient remainder answer. The significance of these terms will be outlined now, but for a full and complete understanding thereof, reference may be had to aforementioned copending applications Serial Nos. 419,012, 422,526 and 607,952. The latter two cases are directed to the keyboard actuated unit wherein the coded control tapes are prepared.

Since a photocomposing machine as herein contemplated incorporates a unit system of assigning character widths and linear dimensions, it will be obvious that the linear distance between a left hand and a right hand margin will comprise a fixed predetermined number of units; a unit being one eighteenth part of a typographical em in an eighteen unit system. If, by way of example, we assume a justified line length of thirty ems, then the line will comprise 30×18 or 540 units. Now, if we assume that in composing a line of text, the unit widths of the characters and normal word spaces which go to make up the line total 517 units and that there are five interword spaces in the line, then there is seen to be a line remainder of 540−517 or 23 units which must be divided among the five interword spaces. Dividing 23 by 5 gives a quotient of 4 and a remainder (designated in our description as the quotient remainder) of 3. Thus each normal word space must be increased by at least 4 units. To accommodate the remainder, each of the first three word spaces in the line is increased by 4 plus 1 or 5 units. In this manner, the entire line remainder is allocated to the interword spaces in the line.

According to the assumption hereinabove made, a justification signal is in decoding position on scan head 110. The signal comprises perforations that cause contacts 127b, 127d and 127f to engage, thus resulting in the energization of coils 3SD, 5SD and 7SD. Energization of coil 3SD causes contacts 3SD1 and 3SD2 to engage and contacts 3SD3 to separate. Energization of coil 5SD causes contacts 5SD1, 5SD2 and 5SD6 to engage and contacts 5SD3, 5SD4 and 5SD5 to separate, while energization of coil 7SD causes contacts 7SD1, 7SD3, and 7SD7 to engage and contacts 7SD2, 7SD4, 7SD5 and 7SD6 to separate. Therefore, a circuit is completed through contacts 1SD1, 2SD1, 3SD1, 4SD1, 5SD1, 6SD1, 7SD1 and 8SD1 to the justification decode relay coil JD and rectifier RJD, and, RJD1, scan end-of-line relay coil SELD, contacts ELG2, FCP1, QTAS1 and QUAS1, JAS1 and SP (a start photography contact), to thereby engage contacts JD1 and JD2 and engage contacts SELD1, respectively. Contacts JD1 complete a self holding circuit for coils JD and SELD. The end-of-line signal in decoding position on the read head 111 results in the completion of a circuit through the read head end-of-line response circuitry (represented by block 134 in Fig. 6) to energize end of line relay coil RELD and separate contacts RELD1 and engage contacts RELD2 and RELD3. Contacts RELD2 complete a self holding circuit for coil RELD.

Contacts SELD1 and RELD3 complete circuits to step the quad ems tens stepping switch QTST, the quad ems units stepping switch QUST, and the justification stepping switch JST to their home positions. The home stepping circuit for the quad ems tens switch QTST is traced through the stepping coil QTST for the switch, interrupter contacts QTST3 which separate when coil Q is energized and engage upon deenergizing of the coil, rectifier RQT, contacts QTST2, which are engaged when the brushes QTB1, etc., are off the home contacts QTC1-H, etc. and which separate when the brushes reach the home position, and contacts SELD1 and RELD3. In operation, coil QTST is energized through the circuit just described. Immediately upon its energization, contacts QTST3 separate to deenergize the coil and step the switch one position, that is, advance the switch brushes to the next row of contacts. Deenergization of the coil causes contacts QTST3 to again engage whereupon the coil is energized to separate contacts QTST3. Separation of the contacts deenergizes the coil to again step the switch one position and engage the contacts. The alternate energizing and deenergizing of the coil is continued until finally the switch reaches its home position where brushes QTB1 etc. engage contacts QTC1-H etc., at which time, contacts QTST2 separate to deenergize the stepping coil circuit. In addition to contacts QTST2 separating, contacts QTST1 engage upon the switch reaching its home position.

The quad ems units stepping switch QUST and the justification stepping switches JST are also returned to their home position, but since the circuits for accomplishing this result are similar to those just described, it is not believed necessary to detail the operation of the particular circuits. However, it will be noted that when these switches reach the home positions, contacts QUST1 and JST1 engage.

Engagements of contacts QTST1, QUST1 and JST1 (which indicate that the various stepping switches are in home positions), completes a circuit, again through contacts SELD1 and RELD3, to energize the gate relay ELG and engage contacts ELG1, ELG3, ELG4, ELG6 and ELG7, and separate contacts ELG2 and ELG5. Contacts ELG3 establish a self holding circuit for coil ELG through contacts FCP1, QTAS1, QUAS1, JAS1 and SP. Separation of contacts ELG2 interrupts the circuit for coils SELD and RELD to restore the relays and their contacts to their normal position as indicated on the wiring diagram. Coil JD, however, remains energized through contacts ELG1 and SP. Restoration of relays SELD and RELD and particularly the separation of contacts SELD1 and RELD3 prevent energization of the homing circuits for the various stepping switches.

As the various stepping switches are returning to their home positions, the control tape is advanced one step on the scan head 110, as by the partial rotation of the scan head drum, to present the justification answer signal to the decoding mechanism. The decoded information is thereupon stored in the memory devices provided in the photocomposing machine.

Justification decode contact JD2 and gate relay contact ELG7 complete a circuit for the justification answer search relay coil JS, thereby engaging contacts JS1, JS2, JS3 and JS4. A self holding circuit is established by contacts JS4 while contacts JS1 complete a circuit for the storage of the justification quotient answer. Contacts 9SD1, 10SD1, 11SD1, 12SD1 and 13SD1 selectively engaged in response to the tape decoding mechanism i.e., the apparatus of Figs. 3 and 4. For purposes of illustration, it will be assumed that the quotient answer is fourteen. The tape will be perforated, therefore, to actuate the decoding mechanism to result in the engagement of contacts 10SD1, 11SD1 and 12SD1 which complete the circuits for the binary eight units relay coil BE, the binary four units relay coil BF and the binary two units relay coil BT, respectively. Energization of coil BE results in the engagement of contacts BE1, BE3, BE4 and BE5 and the separation of contacts BE2 and BE6. Energization of coil BF results in the engagement of contacts BF1, BF3, BF4 and BF5 and the separation of contacts BF2 and BF6. Energization of coil BT results in the energization of contacts BT1, BT3, BT4 and BT5 and the separation of contacts BT2 and BT6. It will be recognized from the relay designations that the relays represent the binary values 8, 4 and 2 which, when totaled equal the desired quotient answer fourteen. As a further example, if the quotient answer is seventeen, the tape will be perforated to cause the decoding mechanism to engage contacts 9SD1 and 13SD1. These complete circuits for the binary sixteen units relay coil BS and the binary one unit relay coil BO. Consequently, contacts BS1, BS3 and BS4, engage while contacts BS2 separate. Also, contacts BO2, BO3, BO4 and BO5 engage and contacts BO1 and BO6 separate. An understanding of the function of these relays and contacts will be apparent from what has been set forth above and the further description hereinafter.

In addition to energization of the binary unit relay coils resulting from engagement of the particular decoder relay contacts, e.g. 10SD1, 11SD1 and 12SD1, and contacts JS1, the latter contacts also complete a circuit for the add one unit relay coil AO to engage contacts AO1, AO3 and AO5 and to separate contacts AO2 and AO4. The significance of this additional relay will be understood by reference to the description concerning the justification terms quotient and quotient remainder. It is recalled that the quotient defines the number of units-of-an-em which are added to each interword space to provide a justified line. If there is a quotient remainder, then the first number of word spaces equal to the quotient remainder answer, are increased by a number of units-of-an-em equal to the quotient plus one. Hence there is an add one unit relay provided. It follows from what has been stated that if the justification answer does not include a quotient remainder, the add one unit relay AO will not be energized. On the other hand, if there is a quotient remainder and the relay is energized, it must be deenergized after the machine has provided the first number of word spaces equal to the quotient remainder. The control of the relay when there is no quotient remainder answer will now be considered, while the conditions which obtain when the relay is energized, as well as the control effected by the binary unit relays will be considered hereinafter when attention is directed to the electronic comparator circuits.

Before describing the quotient remainder memory device, it is believed desirable to indicate the preferred coding arrangement for the quotient remainder. From Fig. 2 it is observed that five code stations are devoted to the quotient remainders. The decoding apparatus (Figs. 4 and 5) for these five stations control the energization of relay coils 8SD, 7SD, 6SD, 5SD and 4SD which represent the binary values 1, 2, 4, 8 and 16 respectively. Thus, for example, if a quotient remainder of twenty-four is to be coded, the tape will be perforated so that relays 5SD and 4SD will be energized when the signal is in decoding position. As a further example, if a quotient remainder of seven is coded, the tape will be perforated so that relays 8SD, 7SD and 6SD will be energized when the signal is in decoding position.

It will first be assumed that a quotient remainder answer of zero is encountered. In this case, that portion of the tape devoted to the quotient remainder answer will be unperforated in which event the decoding apparatus will not be actuated and no one of relay coils 8SD, 7SD, 6SD, 5SD or 4SD will be energized. Consequently, the contacts controlled by the coils will be in their normal or deenergized state as illustrated on the wiring diagram. Thus contacts 8SD8, 7SD6, 6SD6, 5SD5 and 4SD5 will be engaged.

The energization of justification memory gate coil JS, in addition to causing the completion of the circuits for the binary relay coils through contacts JS1, also completes a circuit for the justification stepping switch coil JST; the circuit being traced through coil JST, interrupter contacts JST3, rectifier RJ1 and contacts JS3. Energization of coil JST results in the brushes JB1 etc. stepping from engagement with home contacts JC1–H etc. to the next group of contacts JC1–25 etc. in accordance with the stepping operation hereinabove described. In the present instance, where there is being considered a zero quotient remainder, as soon as the brushes JB1 etc. step one position and brush JB1 engages contact JC1–25, a circuit is completed through contacts JS2, brush JB1, contact JC1–25, the serially connected contacts 8SD8, 7SD6, 6SD6, 5SD5 and 4SD5, rectifiers RJ2 and RJ3, interrupter contact JST3, rectifier RJ1 and contacts JS3, to short out coil JST and thereby prevent further stepping of the justification stepping switch. A similar circuit is traced through the serially connected contacts 8SD8, 7SD6, 6SD6, 5SD5 and 4SD5, rectifier RJ4, contacts 135 and JST4, resistor RAO and contacts RELD1 to short out coil AO and thereby prevent energization of the add one unit relay.

When the quotient remainder stepping switch coil JST is shorted out, as it always will be when the brushes JB1 etc. reach the group of contacts representing the quotient remainder, and the stepping switch comes to rest in the answer position, a circuit is completed for the remainder information stored relay coil JAS, through the serially connected contacts 8SD8 etc., rectifier RJ2, coil JAS and contacts JS3, thereby signalling the apparatus that the quotient remainder information is stored and that the next operation may be commenced.

If, instead of assuming that the quotient remainder is zero, it is assumed that a quotient remainder of seven is to be stored in the quotient remainder memory or storage device, then that portion of the tape assigned to the coding of quotient remainder information will be perforated so that the decoding apparatus energizes coils 8SD, 7SD and 6SD to thereby engage contacts 8SD7, 7SD7 and 6SD7 while separating contacts 7SD5 and 6SD5. Under these conditions stepping of the quotient remainder stepping switch will continue until brushes JB1 etc. engage contacts JC1-7 etc. at which time a circuit to short out coil JST and arrest stepping switch motion will be traced through contacts JS2, 8SD7, 7SD7, 6SD7, brush JB4 serially connected contacts JC4-7, JC5-7 and JC6-7, brush JB6, and rectifier RJ3 to the connection between coil JST and contacts JST3. Again a circuit can be traced for energizing coil JAS to again indicate that the justification quotient remainder answer has been stored.

It will be observed that in designating the contacts of the stepping switch, the numeral preceding the hyphen of the reference character tells the contact layer of the stepping switch while the numeral following the hyphen represents a quotient remainder answer. Thus if the brushes stop on contacts bearing the suffix numeral 21, then the quotient remainder answer is 21 and the circuit for shorting out the stepping switch coil JST will be traced through contacts JS2, 8SD7, brush JB2, contacts JC2-21, JC3-21, brush JB3, contacts 6SD7, brush JB4, contacts JC4-21, JC5-21, brush JB5, contacts 4SD6, and rectifier RJ3. It is thus clear that the perforations formed in the control tape to code a quotient remainder of twenty-one (21) must be such as would lead to the energization of coils 8SD (binary 1), 6SD (binary 4) and 4SD (binary 16).

The storage of a justification answer has been described and, as is known from the present description and the aforementioned application Serial No. 419,012, this answer controls the interword spacing in the photographically recorded line so that a justified line results. The means by which this control is effected will now be described.

Figure 9:
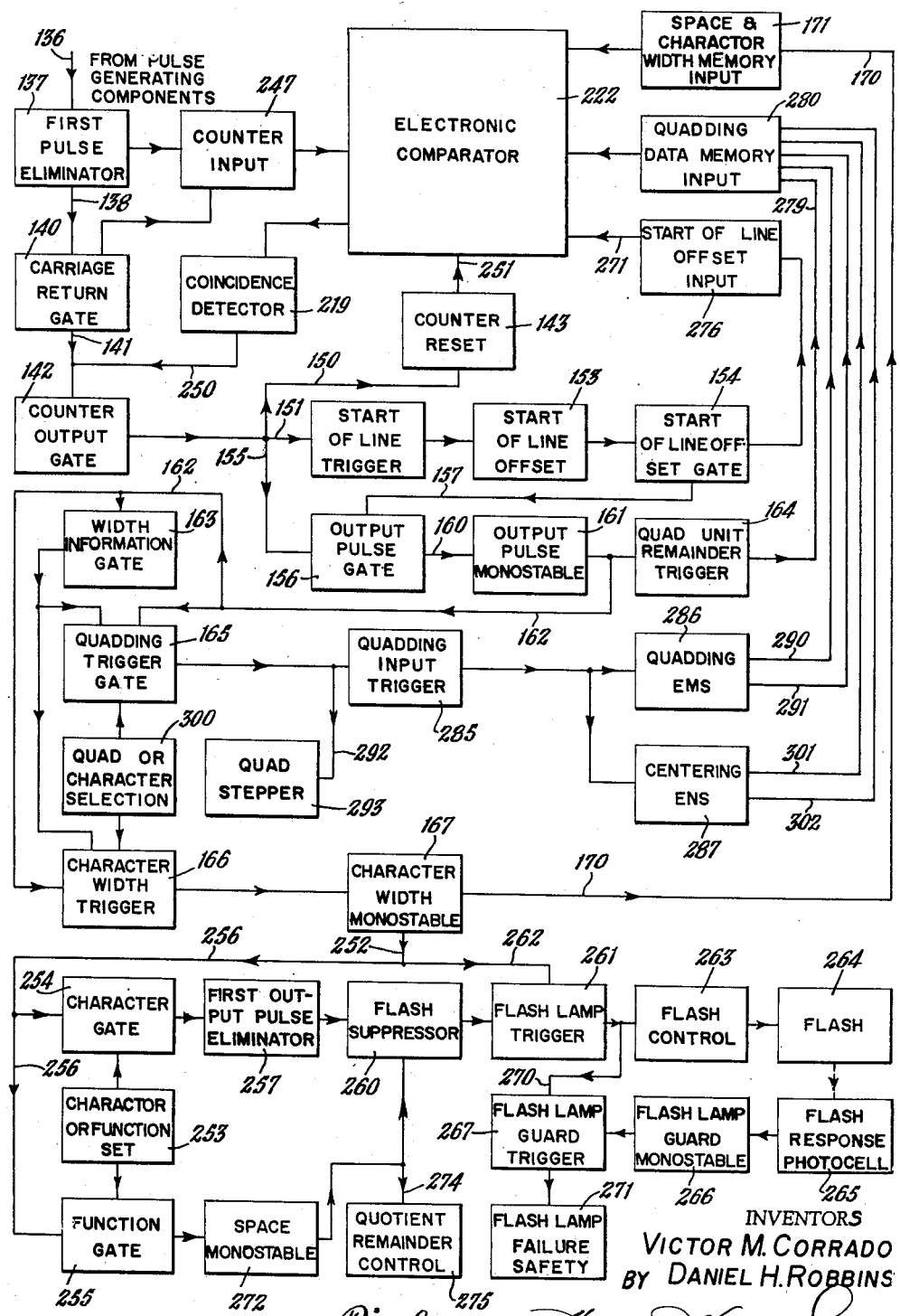
Fig. 9 is a block diagram showing the electronic components for controlling the photography of the individual characters in a line of composition.

Attention is now directed to Fig. 9 wherein is shown in block diagram form the circuit elements for controlling the precise instants during the continuous line composing movement when the light source 50 is flashed to reproduce or record the selectively exposed characters to produce a line of latent images. The present discussion will concern itself with the production of a justified line. Hereinafter the discussion will be directed to the control functions for photographing quadded lines, that is, lines being flush with the left hand margin (quadded left) or with the right hand margin (quadded right), in either case the interword spacing being of normal or standard width, and for centered lines or lines having normal width interword spaces and located midway between the right and left hand margins.

The pulses from the pulse generating components hereinabove referred to i.e. photocell unit 76, are transmitted as positive pulses over conductor 136 to the circuit component designated as the first pulse eliminator 137 which is simply a triode tube. Considering the very first pulse generated as the first grating slit traverses the light beam extending between the light source and the photocell of photocell unit 76, the pulse input thereto causes a negative pulse output therefrom which is transmitted to the carriage return gate 140 which is a conventional bi-stable multivibrator normally biased in such a way that the negative pulse input causes a negative output pulse to be transmitted over conductor 141 to the counter output gate 142. This gate, whose function will be mentioned later, is a monostable multivibrator which, upon receiving the negative input pulse, produces a positive output pulse that energizes the counter reset tube 143 to reset the counter. Inasmuch as the very first pulse generated by the grating and photocell unit results in a reset of the counter, it is obvious that this first pulse is not itself counted in the counting operation that totals the units-of-an-em travelled by the carriage 70.

Inasmuch as the present description has assumed the photocomposition of a justified line, a character signal will be in decoding position on the read head 111. The justification signal information will already have been stored as hereinabove described. The actuation of the shutter mechanism 55 to expose the character selected for photographing is by means fully explained in aforementioned application Ser. No. 419,012.

Figure 10:
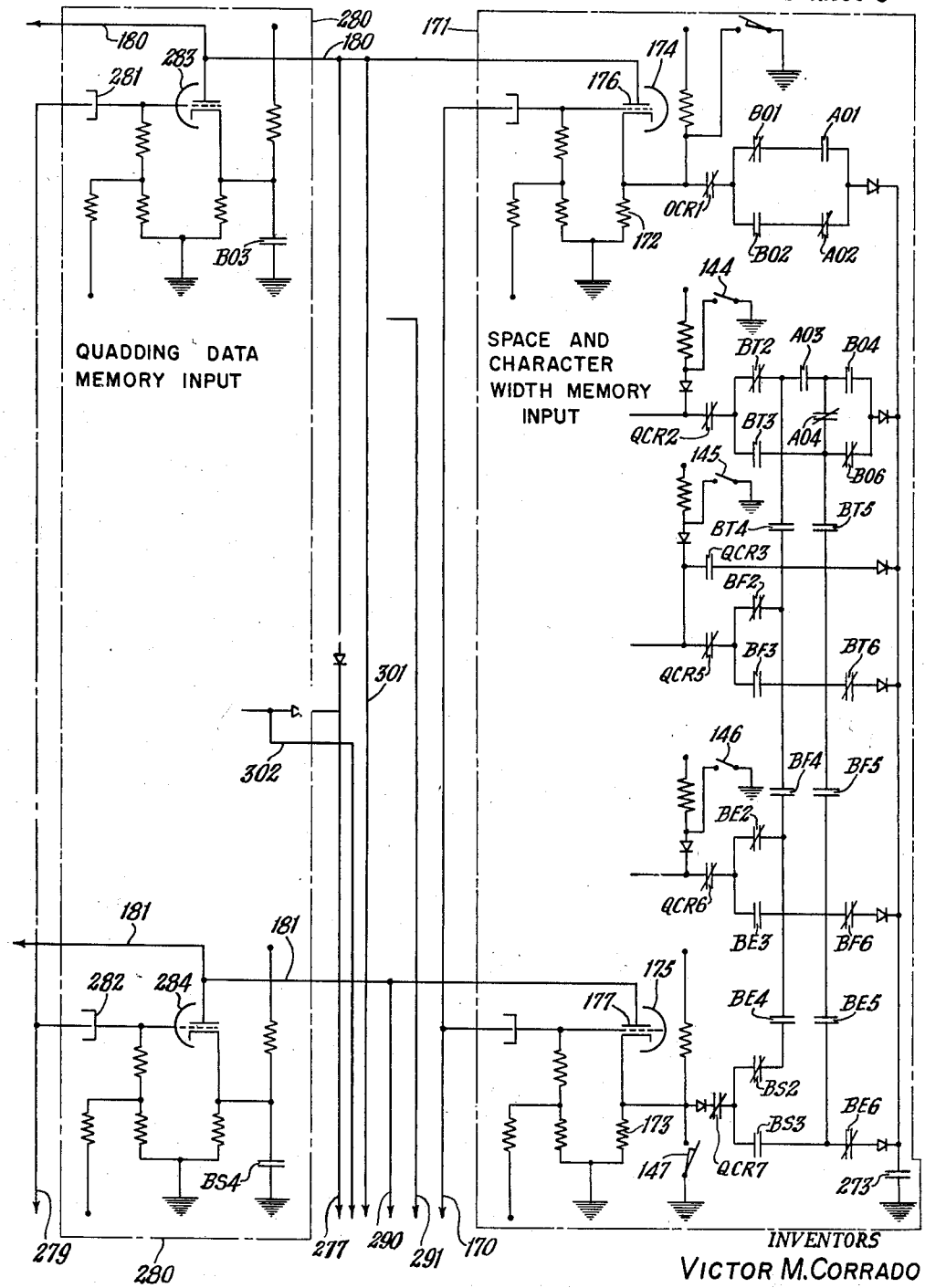
Fig. 10 is an electrical diagram showing the circuitry for introducing character width, justification, quadding and centering information to the electronic comparator.

As hereinabove stated, the width portion of the character signal comprises five code stations which are represented on the read head decoder by switches 143, 144, 145, 146 and 147. (Fig. 10.) These represent binary values 1, 2, 4, 8 and 16 respectively, so that, if a character width of ten is to be represented, the coded control tape will be perforated to cause the actuation of switches 144 and 146. As a further example, if a character width of twenty-one is to be represented the tape will be perforated to cause the actuation of switches 143, 145 and 147. For our present purposes, there will be assumed a character width of seventeen units. The tape, therefore, will be perforated to actuate switches 143 and 147.

Figure 11:
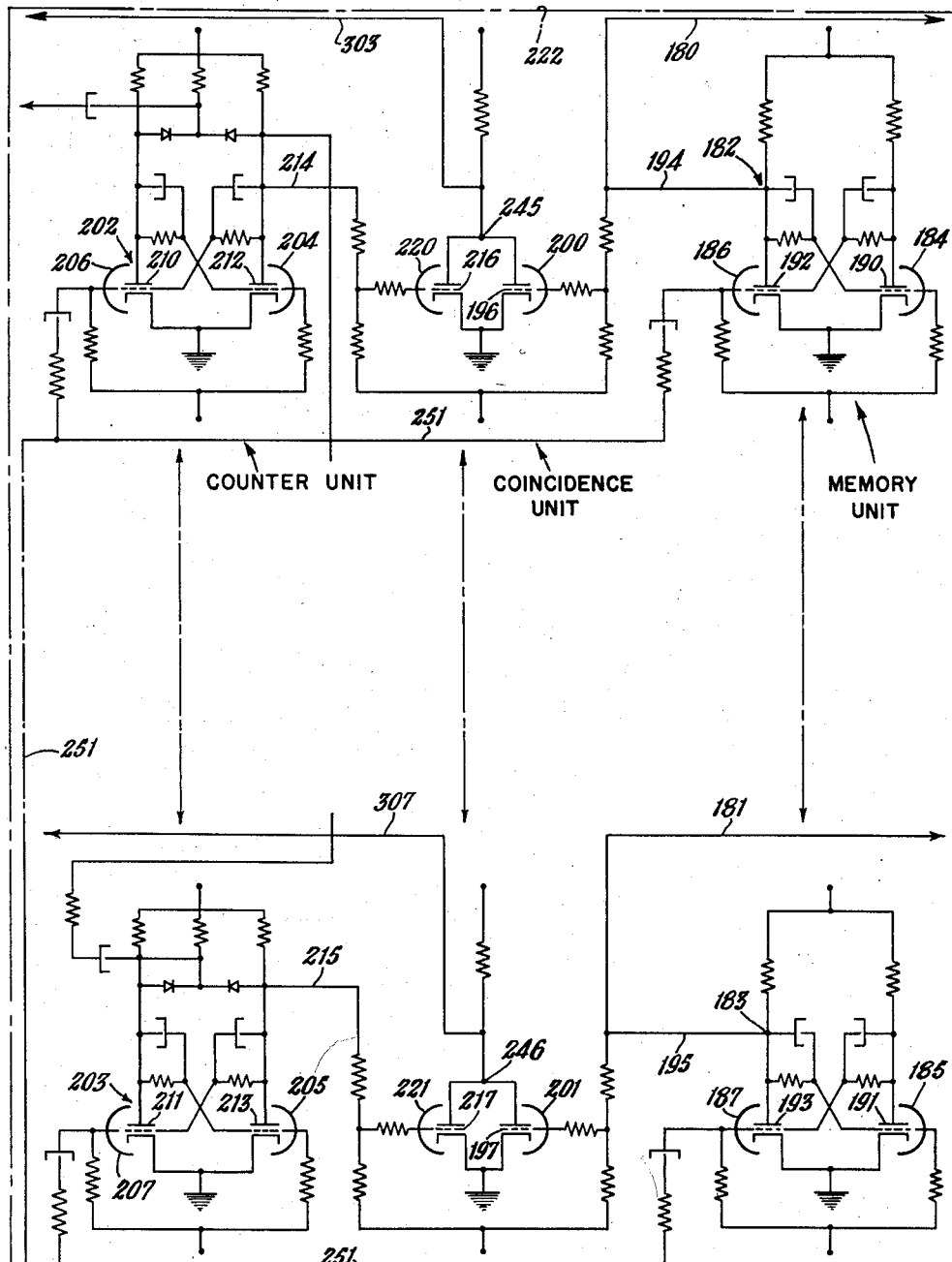
Fig. 11 is an electrical diagram showing the circuitry of the electronic comparator.

Prior to a description of the circuitry it will be observed that Fig. 11 represents a five stage electronic comparator with the first and last stages illustrated. The omitted stages are identical to those shown and the connections between stages are conventional. As will later be seen, the comparator comprises three general circuit groups, namely a memory group, a counter group and a coincidence group. Fig. 10 represents the input circuitry leading to the memory group and it likewise, in part, shows only the first and last stage of a five stage unit. A similar observation to that made with reference to Fig. 11 also applies to the internal connections of Fig. 10. The switching arrangement for energizing the circuitry is shown in its entirety. Since a binary system is employed, the various stages in the two figures will have the values, reading from top to bottom 1, 2, 4, 8 and 16. Therefore, the circuits shown are those having the values 1 and 16, and this explains the selection of a character width of seventeen for illustrative purposes.

Attention is again directed to Fig. 9 and to the first carriage grating pulse which produced a pulse in the counter output gate 142. The thus generated output pulse is transmitted over conductor 150 to the counter reset tube 143 and from it the counter is reset to its zero state. The pulse is also transmitted by conductor 151 to the start of line trigger tube 152 and from the tube a pulse is fed to the start of line offset monostable circuit 153 and from the latter to the start of line offset gate 154. Gate 154 is a bi-stable multivibrator which, under conditions now to be assumed, will be unaffected by the pulse from offset circuit 153. The start of line offset function will be explained hereinafter, but suffice it to say for the present that the gate 154 is unaffected by the initial pulse. However, because of the stable state in which gate 154 is initially set, a positive bias is placed, by way of conductor 155, on the output pulse gate 156. This component comprises a two control grid tube and the just mentioned bias is effected on one of such grids. It will be noted however that the initial bias will not cause the tube to conduct.

The pulse which is produced in the counter output gate 142, in addition to being transmitted over conductors 150 and 151, is also transmitted over conductor 155 to output pulse gate 156, where it is impressed on the second control grid of the tube. The cumulative effect of the initial bias and the pulse is sufficient to fire the tube and produce an output pulse on conductor 160 that is transmitted to the output pulse monostable 161 which itself produces an output pulse that is transmitted by conductor 162 to the width information gate 163. Gate 163 is a bistable multivibrator which, when the photocomposing machine is started in operation, is biased to one stable state. Under present suppositions, that is, when a justified line is being considered, the multivibrator remains in its initially set state. As a consequence the pulse from the output pulse monostable 161 is ineffectual as regards gate 163 or the quad unit remainder trigger 164. A different result obtains when a line that is to be quadded right or centered is photographed, but that will be gone into hereinafter when such operations are considered.

Due to the initial setting of gate 163, a positive bias is impressed on each of the control grids of the tubes which compose the quadding trigger gate 165 and the character width trigger 166. The gate 165 and the trigger 166 are two control grid tubes, but the bias from gate 163 is insufficient to fire the tubes. The gate 165 and the trigger 166 are further provided with cathode resistors which may be selectively shorted out depending on whether the line is to be justified, or quadded or centered, respectively. Since we are considering a justified line, the cathode resistor for gate 165 will be shorted out.

It will be noted in Fig. 9 that the pulse produced by the output pulse monostable 161 is transmitted by conductor 162 to the quadding trigger gate 165 and the character width trigger 166. This pulse is transmitted to the second control grid of each tube, but since the cathode voltage of the quadding trigger gate is lower than that of the character width trigger, the pulse will fire the character width trigger tube rather than the quadding trigger gate tube.

The pulse generated thereby is transmitted to the character width monostable 167 which shortly thereafter produces a positive pulse which is transmitted by conductor 170 to the space and character width memory input 171. Reference is now made to Fig. 10 where the memory input 171 is seen to comprise the switching circuitry and tubes hereinabove referred to.

Since we assumed that the first character of the justified line to be photographed has a set width of seventeen units, switches 143 and 147 will be engaged, inasmuch as these are in the circuitry for the binary 1 and the binary 16 memory inputs. Switches 143 and 147 as well as switches 144, 145 and 146 are, as hereinbefore indicated, decoding switches on the reading head which interpret width information. That is, they are actuable by the character width signal perforations. If the character width were fourteen units, then switches 144, 145 and 146 would be actuated. As a further example, if the character width were seven units, then switches 143, 144 and 145 would be actuated.

Returning to our original example where switches 143 and 147 are closed, it is seen that the effect of such closure is to short out the cathode resistors 172 and 173 of electron tubes 174 and 175 respectively. Such shorting out is ineffectual to fire the tube since the bias on the grid of the tube is sufficiently negative. However, it does increase the cathode-plate potential so as to prepare the tube for firing or conduction. Consequently, when a positive pulse is transmitted from the character width monostable 167 over conductor 170, tubes 174 and 175 fire. The remaining tubes (not shown) do not fire even though the same positive pulse from conductor 170 is applied to their respective grids because there is an insufficient potential between their cathodes and plates.

When the tubes 174 and 175 fire, the voltages at their plates 176 and 177 drop, with the consequence that a negative pulse is transmitted over conductors 180 and 181 to the counter memory storage bi-stable multivibrators 182 and 183 respectively (see Fig. 11). The counter memory storage multivibrators are initially biased when the electronic circuitry is energized so that the right hand tubes 184 and 185 are conducting, and tubes 186 and 187 are non-conducting. Consequently, plates 190 and 191 are at a low potential while the plates 192 and 193 of non-conducting tubes 186 and 187 are at a relatively high potential. Inasmuch as plates 192 and 193 are at a high potential, by way of conductors 194 and 195, the grids 196 and 197 of coincidence tubes 200 and 201 have a high voltage impressed thereon and the tubes 200 and 201 are conducting.

Before tracing the above mentioned negative pulses from the space and character width memory circuits, and the consequences thereof, attention will be directed momentarily to the counter group of electron tubes shown in Fig. 11. The various stages of the counter group of tubes comprise, as does the memory group, a series of bistable multivibrator circuits. In the present embodiment, a five stage counter is employed, the stages of which represent the binary values 1, 2, 4, 8 and 16. In the illustration of Fig. 11, multivibrator 202 represents the value 1 while multivibrator 203 represents the value 16. The intermediate values 2, 4 and 8 are represented by three intermediate multivibrators not shown, but connected in a conventional counting circuit.

In the normal or zero count state, the right hand tube (as viewed in Fig. 11) of the counter group of multivibrators is in a conducting state. Thus tubes 204 and 205 are conducting current and tubes 206 and 207 are in a quiescent condition. Consequently, the potentials at plates 210 and 311 are relatively high, while the potentials at plates 212 and 213 are relatively low. Plates 212 and 213 are connected by way of conductors 214 and 215 and intermediate resistors to the grids 216 and 217 of the coincidence tubes 220 and 221 and the plate potential is sufficiently low that tubes 220 and 221 are cut-off and non-conducting.

If we now consider the first stage of the comparator device as it is with a zero memory input and a zero count input, we see that of the coincidence tubes, one, namely tube 200, is now conducting while the other, tube 220, is non-conducting. It is believed clear from the above description that if the memory input multivibrator 182 is pulsed to its other stable state, as by tube 186 conducting, then coincidence tube 200 will be cut-off and non-conducting. Similarly if the counter multivibrator is pulsed to its other stable state to cause tube 204 to conduct, then coincidence tube 220 will also start conducting. This example occurs when a memory input of one and a counter input of one are introduced. Thus, so far as the coincidence tubes are involved, the fact of coincidence as between the memory input stage and the counter input stage is indicated by one of tubes 200 and 220 conducting or, as presently will be seen in considering the coincidence detector mechanism, when, to put it in different terms, the plate of one of the coincidence tubes 200 or 220 is at a relatively low potential.

Figure 12:
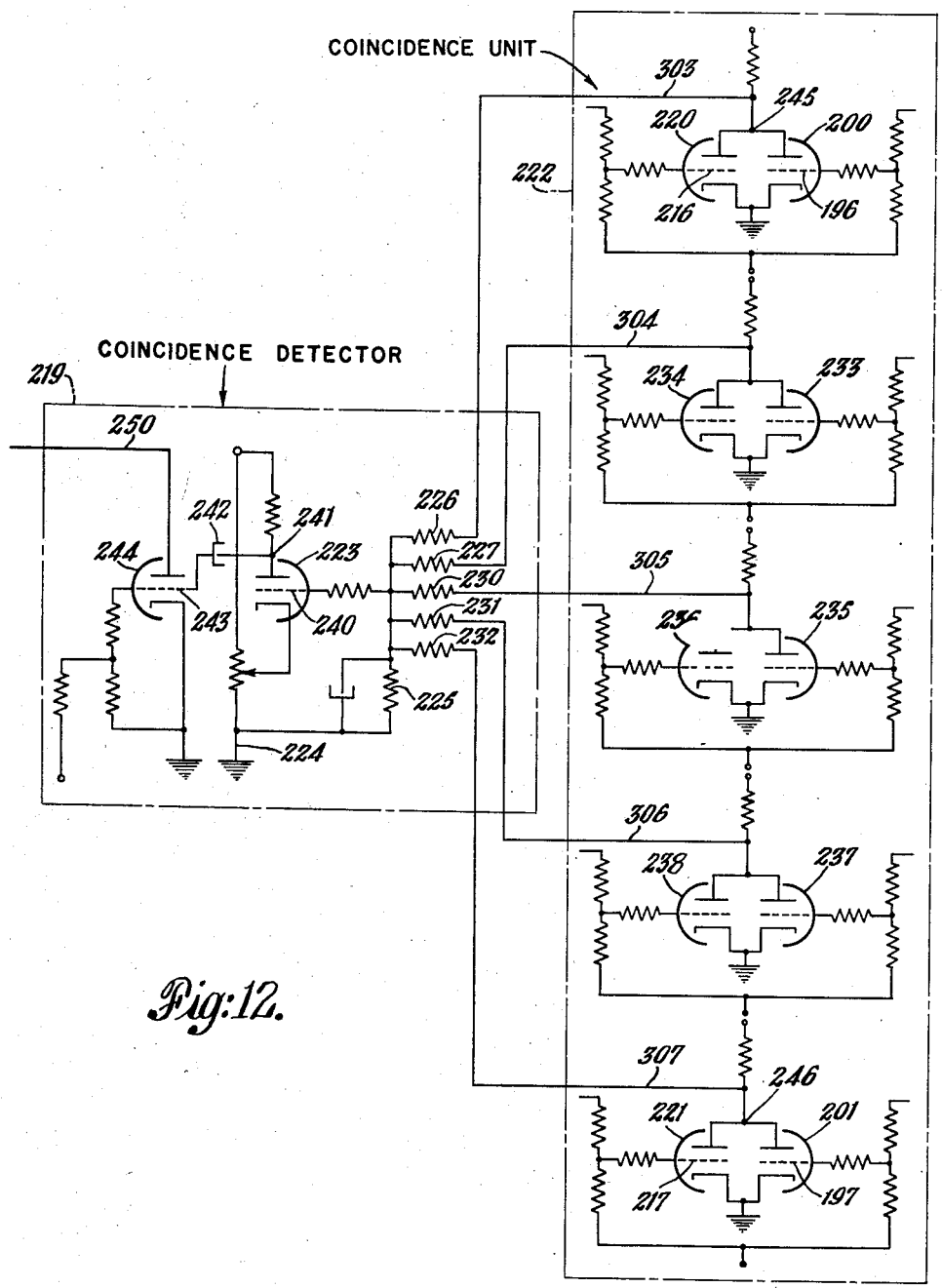
Fig. 12 is an electrical diagram showing the coincidence circuits of the electronic comparator.
Figure 13A:
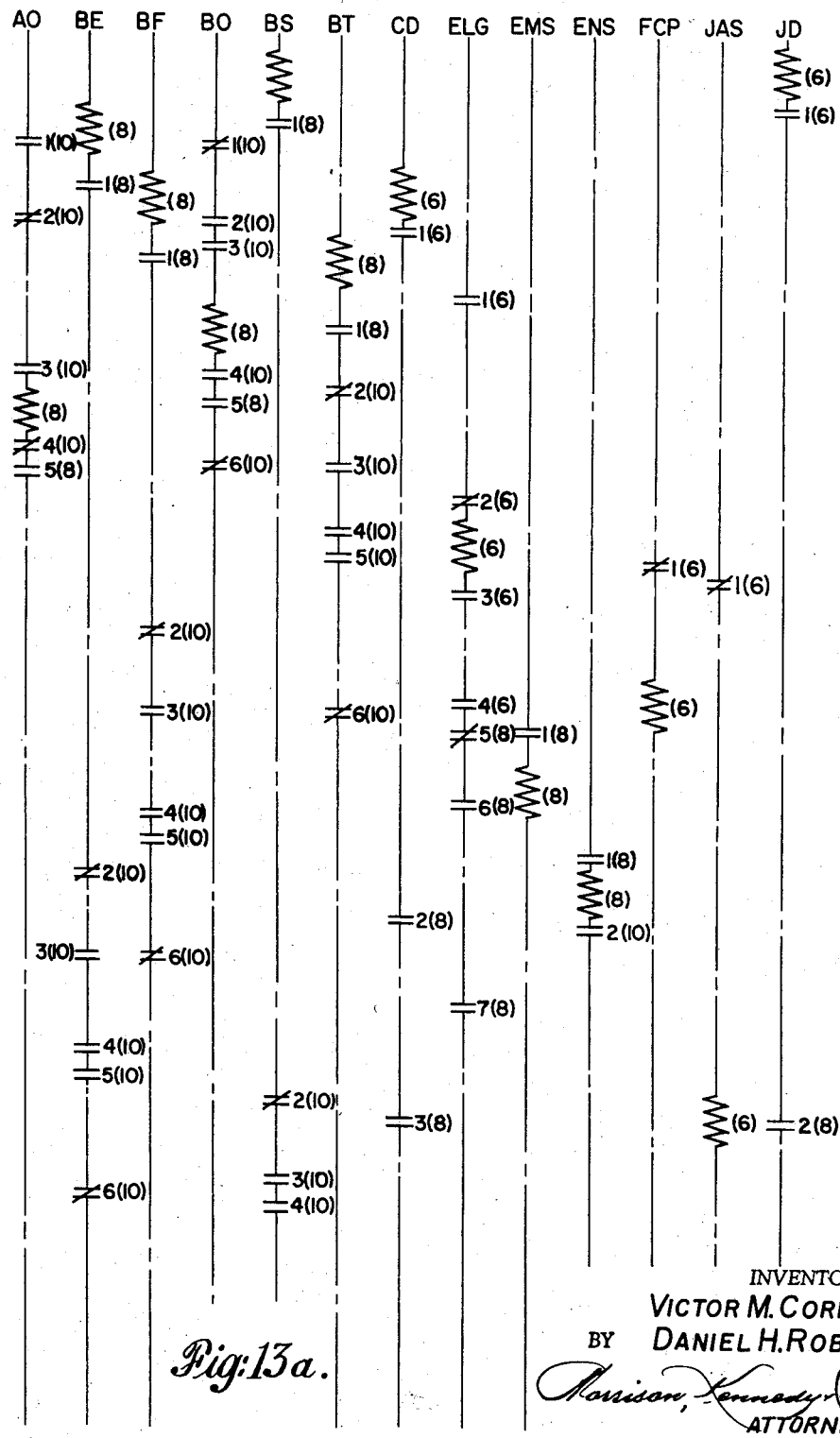

Attention is now directed to Fig. 12, wherein is shown the five coincidence stages of the comparator device 222 and the coincidence detector 219 including tube 223. The detection of coincidence is actually effected by means of a resistor network which runs from ground connection 224 through resistor 225 and each of resistors 226, 227, 230, 231 and 232 to the common plates of tubes 200 and 220, 233 and 234, 235 and 236, 237 and 238, 201 and 221, respectively, by means of conductors 303, 304, 305, 306 and 307. The common junction between the parallel resistors 226, 227, 230, 231 and 232 and series resistor 225 is connected to the grid 240 of detector tube 223. The circuit parameters are such that if each of resistors 226, 227, 230, 231 and 232 is connected to a relatively low voltage (as, for example, by one of tubes 220 or 200 conducting), the potential on grid 240 will be sufficiently low as to cut-off tube 223 and render it non-conducting. However, if even one of the resistors e.g. 226 is connected to a high potential, as it is when both tubes 220 and 200 are non-conducting, then the potential of grid 240 is raised to a voltage sufficient to cause tube 223 to conduct. Of course, if more than one of the parallel resistors are connected to a high potential, tube 223 conducts and in operation will continue to conduct until all of such resistors are connected to a source of low potential.

Consideration will now be given to the normal operating sequence, as when the apparatus is initially connected to its power supply. The counter multivibrators will be set as above indicated for a zero count and the memory multivibrators also will be set for a zero input. As a result, one tube of each coincidence pair will be conducting so that each and every one of resistors 226, 227, 230, 231 and 232 will be connected to a low voltage source. Consequently, tube 223 will be cut-off and its plate will be at a high voltage. Now if width information is introduced to the memory group of multivibrators, at least one of the coincidence tubes e.g. 200, which had been conducting, will be cut-off and both tubes of that coincidence pair will be extinguished so that the plates thereof will be at a high voltage. Since this relatively high voltage is applied to one of the resistors 226, the voltage of grid 240 will be raised and tube 223 start to conduct. When it does, the plate voltage drops. Thereafter, when pulses from the carriage grating pulse generator are introduced to the counter group and the count coincides with the memory input, the voltage on grid 240 drops to a point sufficient to cut-off tube 223. This effect, with a consequent rising of the plate 241 voltage, produces a positive pulse which is transmitted through capacitor 242 to the grid 243 of tube 244 causing the latter to fire. When the tube does fire, its plate voltage drops, thereby producing a pulse which is transmitted through gate 142 and counter reset tube 143 to reset the counter in preparedness for the introduction of additional width information. Other effects will also transpire and these will now be considered.

Again returning to our original example wherein we assumed that the initial bit of width information was introduced for a seventeen unit character. Therefore, in the memory group of multivibrators, a pulse would have been introduced to multivibrator 182 and multivibrator 183 causing tubes 184 and 185 to be extinguished and tubes 186 and 187 to conduct or fire. The consequent drop of voltage at plates 192 and 193 is reflected in a lowering of the grid voltages of tubes 200 and 201 so that the tubes are extinguished. Inasmuch as their companion tubes in the coincidence pairs are also non-conducting, due to the fact that the counter group of multivibrators is set for zero count, the voltages at plates 245 and 246 are relatively high. This raises the voltage of grid 240 and tube 223 starts to conduct. Since, at this instant, the carriage 70 is travelling for line composition, the grating pulse generator, i.e. photocell unit 76, is producing one pulse for each unit of distance equal to an em traversed by the carriage. The pulses are transmitted through the counter input 247 (Fig. 9) to the counter group of multivibrators where they are counted in the generally known manner. When the count reaches seventeen (corresponding to the example), there is coincidence between each stage of the counter group and the memory group of multivibrators. The voltage on the grid of tube 223, therefore, is reduced to cut off conduction in the tube and raise the plate voltage, thereby initiating conduction in tube 244 and, by virtue of a drop in its plate voltage, pulsing the counter output gate monostable 142 which is connected thereto by conductor 250. Monostable 142 produces a positive pulse which is fed to the counter reset triode 143, causing a negative pulse to be transmitted over conductor 251 to reset the counter group of multivibrators and the memory group of multivibrators to their initial or predetermined steady state condition.

The pulse from counter output gate 142 again is transmitted to the start of line trigger 152 and from there to the start of line offset monostable 153 and the start of line offset gate 154. This latter component is a bi-stable multivibrator which was set in one state by the initial counter output pulse generated by the very first pulse from the photocell unit 76. Consequently, the counter output pulse now under consideration has no effect on the start of line offset gate, nor does any subsequent output pulse generated during composition of a line.

The counter output pulse is also transmitted by way of conductor 157 to the output pulse gate 156 which is and was initially biased by the first counter output pulse generated during line composing movement of carriage 70. Once gate 156 is biased, it remains so during the entire line composition. Thereafter, each counter output pulse produces a negative pulse which is transmitted from gate 156 to output pulse monostable 161 and from there, as a positive pulse, to conductor 162. A capacitor-rectifier circuit converts the positive pulse to a positive spike followed by a negative spike, the negative spike being transmitted to the width information gate 163. The gate is a bistable multivibrator which is set in one stable state only when a quadded line, or more specifically a quadded right or a centered line, is being composed and then only during that time before the first character in the line is to be photographed. For present considerations, the gate is in its other stable state and unaffected by the negative spike. The quad unit remainder trigger 164 is also unaffected at the present time, but it will be hereinafter referred to when circuit functions are described for a quadded line.

The positive pulse output from monostable 161 is transmitted by conductor 162 to both the quadding trigger gate 165 and the character width trigger 166. Both of these components are two-control grid tubes, but since the line is not being quadded, quadding trigger gate 165 will not have an initial bias and consequently the tube will not fire in response to the output pulse monostable pulse. The character width trigger tube, however, does have an initial bias and, therefore, it fires in response to the output pulse from monostable 161. A negative spike output triggers the character width monostable 167 which transmits a negative pulse over conductor 252 (this will be considered hereinafter) and a positive pulse over conductor 170 to again introduce character width information for the next character to be photographed into electronic comparator 222.

Reference will next be made to the character or function set component 253 (Fig. 9). As hereinbefore stated when the coded tape was described, all function signal rows are provided with an additional signal in line with the function signal which determines whether the function signal will be decoded on scan head 110 or on read head 111. Certain signals, such as the word space signal, will be decoded on the read head only, while other signals such as the end-of-line signals will be decoded on both decoding heads. A character signal, not being a function signal, will be identified by one of the additional signals. The component 253 is a pair of triodes, only one of which conducts at a time. If the signal on the read head is a character signal, as is now being considered, the triodes are set so that the character gate 254, which is a two control grid tube, is given an initial bias. The function gate 255, which is a similar type tube, is not given an initial bias. Consequently the positive pulse from conductor 252 which is applied to both tubes by way of conductor 256 fires only the character gate 254 tube. The negative spike output therefrom, triggers the output pulse eliminator monostable 257 which in turn triggers the flash suppressor bi-stable multivibrator 260. The flash suppressor is triggered to a state wherein a positive bias is placed on a control grid of two-control grid tube flash lamp trigger gate 261 and thus conditions gate 261 so that the positive pulse from conductor 262 fires the tube. The negative pulse therefrom triggers the flash control monostable 263 which in turn flashes the photoflash tube 264 which photographs the exposed character.

The light from the photoflash tube energizes the flash response photocell 265 which causes the flash lamp guard monostable 266 to transmit a broad negative pulse to the flash lamp guard trigger 267. Trigger 267 is a two-control grid tube with one grid normally biased so that if a positive spike is applied to the other grid, the tube will fire. However, when the aforementioned broad negative pulse is applied to the normally biased grid, as in the present case, when the flash lamp is actuated to photograph the character, the pulse from the flash lamp trigger gate 261 transmitted over conductor 270 is ineffectual to fire the tube. Should photocell 265 not be energized, as by failure of the flash lamp to be illuminated in response to the pulsing circuit, then the broad negative pulse is not impressed on one control grid so that the tube is initially biased. The pulse over conductor 270 from trigger gate 261, therefore, fires the tube and produces a negative pulse which triggers the flash lamp failure safety monostable 271 and thereby causes the mechanism to shut down. It is thus seen that a safety mechanism is provided which shuts the mechanism down upon failure of the flash lamp to respond to the pulsing circuitry and give an indication thereof.

It might be noted here that, as a matter of sequencing, a negative pulse from the character width trigger 166, in addition to being transmitted to the character width monostable 167, is also transmitted to binary shutter bi-stable multivibrators (not shown) one being provided for each shutter, for the purpose of resetting the shutters to their normal or non-exposing positions. However, the negative pulse which was transmitted from the character gate 254 to the first output pulse eliminator monostable 257 is also transmitted to a monostable (not shown) which triggers the binary shutter bi-stable multivibrators to set the binary shutters and expose the character selected for photography. Of course the shutters will have been actuated and the character exposed prior to the flash lamp being energized as hereinabove described. The monostable which triggers the binary shutter multivibrators to energize the shutters also triggers the read head advance multivibrator (not shown) which causes the read head to step one position and advance the next character signal to decoding position. Thus the signal for the succeeding character is in decoding position prior to the photographing of the "first" character, and the width information for the succeeding character is transmitted to the memory stages of the electronic comparator in response to the negative pulse from the character width monostable 167. Thus, even before a "first" character is photographed, the width information for the next succeeding character is stored in the electronic comparator 222.

The pulse trains above traced and the opeartions controlled thereby are repeated for each character of the first word in the line of composition and a description thereof need not be repeated here. However, before photographing the last character of the first word, in accordance with the sequence of operations outlined in the foregoing paragraph, the read head is stepped and the next signal in the tape will be brought to decoding position. This will be a space signal, that is, a particular function signal.

The control of the apparatus to provide the proper amount of space for the interword will be described hereinafter, but for now, the description will concern itself solely with the suppression of the light flash, all other pulse circuitry functioning being identical to that described for the photographing of a character. Of course, shutters are not actuated, even though a pulse will trigger the binary shutter bi-stable multivibrator, inasmuch as the shutter pre-conditioning switches (that is, those read head decode switches which are actuated by the character identification portion of the character signals) will not be actuated.

Inasmuch as the space signal is a function signal, the additional signal provided therewith will condition the character or function set triode pair 253 to bias the function gate 255 rather than character gate 254. Therefore, when the counter output pulse, which results from coincidence of the count from the carriage grating pulse generator and the space width memory input, causes, as before described, a positive pulse from the character width monostable to be transmitted to both the character gate 254 and the function gate 255, it is the function gate which produces a negative output pulse. This pulse is transmitted to the space monostable 272 which in turn triggers the flash suppressor bi-stable multivibrator 260 and causes it, in its thus conditioned stable state, to lower the bias on one control grid of the flash lamp trigger gate 261. Width the bias on gate 261 low, the positive pulse transmitted to its other grid by conductor 262 from the character width monostable 167 will be insufficient to fire the tube. Consequently the flash control monostable 263 is not pulsed and the flash lamp 264 is not energized. Thus, it will be clear that the flash lamp will be energized only when a character is to be photographed and not when a space is being provided.

The decoding and storage of the justification information was hereinbefore described. Suffice it to say now, by way of repetition and example, that if the justification information is a quotient of ten and a quotient remainder of four, then the quotient will consist of the binary numbers 2 and 8 and as a consequence relays BT and BE will be energized. In addition, the quotient remainder stepping switch JST will be stepped four positions from its home position and the "add one" relay AO will be energized. It is this apparatus, or more particularly the contacts on the relays (see Fig. 10), which feeds space width information to the electronic comparator memory storage stages to provide the proper widths for interword spaces in a justified line; and, even before the first character in the line is photographed, this information is stored in the relays and the stepping switch ready to be fed to the electronic comparator when a space signal is decoded.

The circuitry of relay contacts which introduces the proper justification information to the electronic comparator is seen in Fig. 10. When a space signal is decoded, contacts 273 engage and the contact circuitry is conditioned to energize the triodes 174, 175, etc., just as the switches 143, 144 etc., condition the triodes when a character width is to be introduced to the comparator memory stages. The information is actually stored in the memory stages upon receipt of a pulse over conductor 170 from the character width monostable 167.

Figure 6:
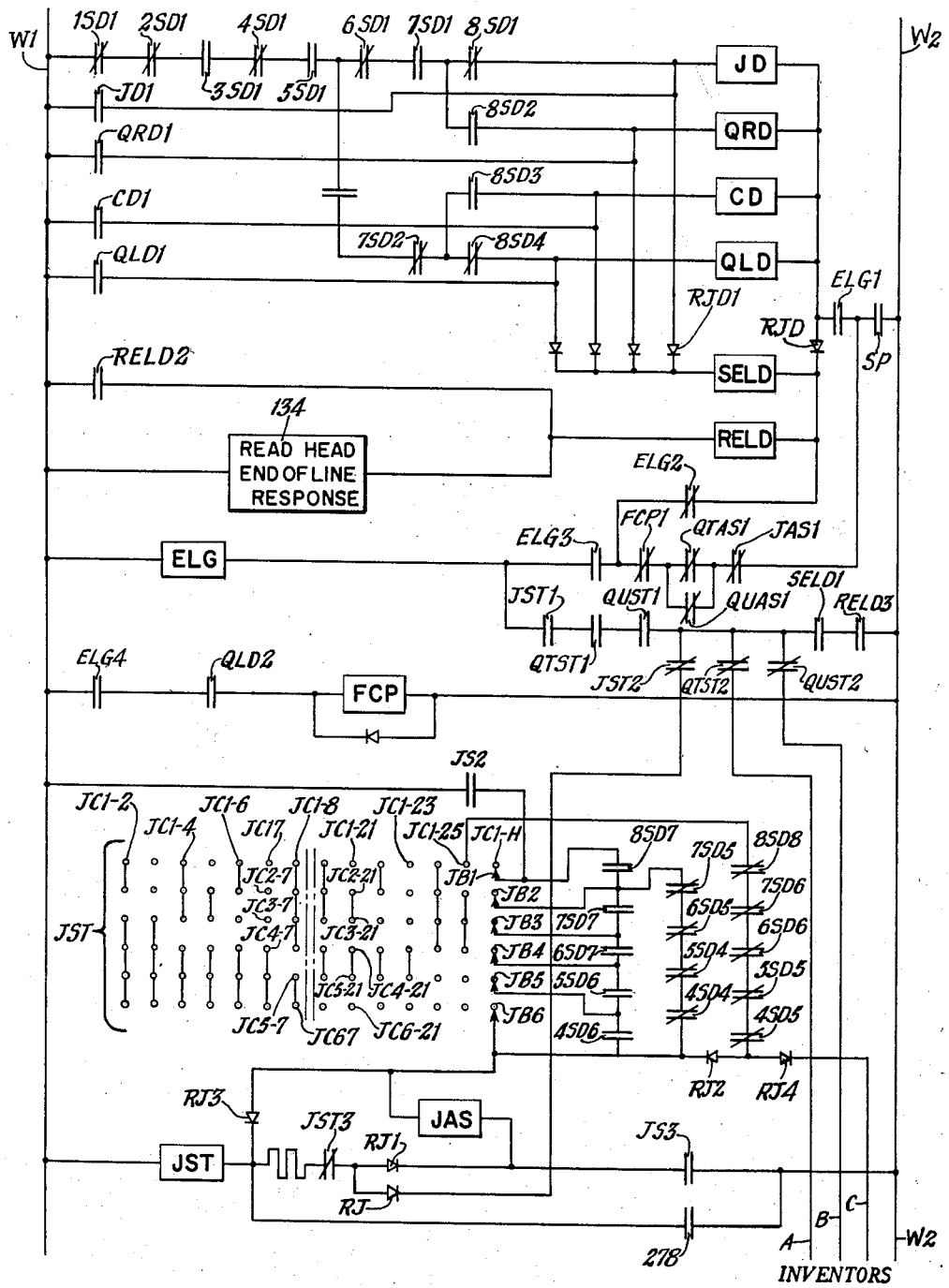
Figs. 6, 7 and 8 are straight line electrical diagrams showing the relay circuitry for storing justification, quadding and centering information.
Figure 7:
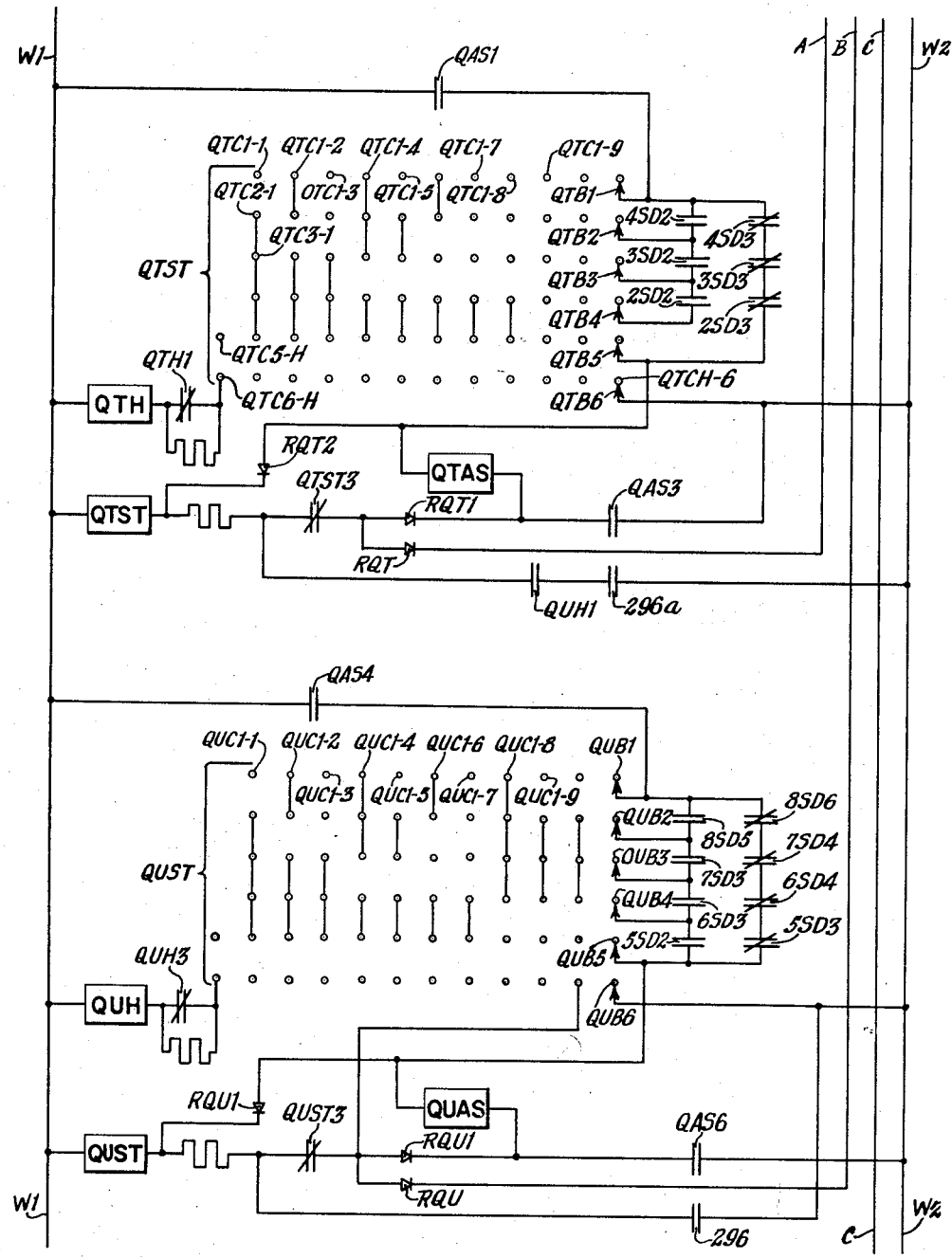
Figure 8:
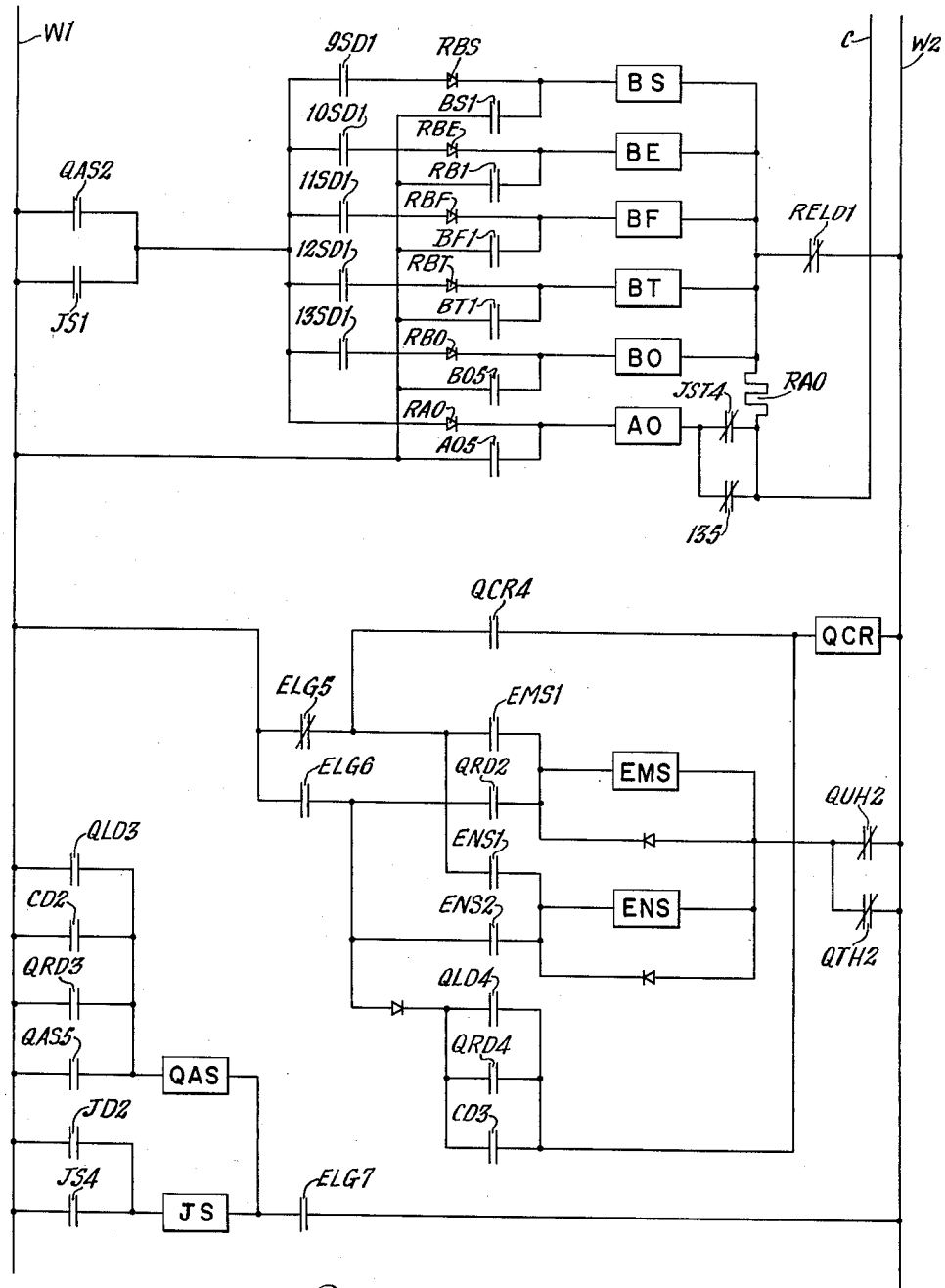

It is thus apparent that when a space signal is decoded, the width of the space, as determined by relays AO, BO, BT, BF, BE and BS, is fed to the comparator and that when this space is counted out by the counter, coincidence takes place, but the light flash is suppressed. The apparatus then proceeds to the photography of subsequent characters and word spaces. However, since there may be a quotient remainder, as in the above example, at some word space in the line, the width of subsequent word spaces will be reduced by one. This eventuality is provided for in the quotient remainder stepping switch JST. In the example cited, the quotient remainder was four and the switch JST was set with the movable brushes JB1, JB2 etc., positioned on the contacts JC1–4, JC2–4 etc., four positions removed from the home position. This means that after four word spaces have been provided in the line, all subsequent word spaces will be reduced one unit in width. In the circuitry above described, when the spacing operation was considered, a space monostable 272 was pulsed to cause the suppression of the flash. The pulse from monostable 272 to the flash suppressor 260 is also transmitted by way of conductor 274 to the quotient remainder control circuitry 275. Each pulse to control circuitry 275, each of which occurs when a space signal is decoded, steps the movable brushes of the justification stepping switch one position closer to the home position, as by the momentary engagement of contact 278 (Fig. 6). Thus in the example considered, after four spaces have been provided for in the line composition, the movable brush would have reached home position and circuits completed and relays actuated which would deenergize the add one relay AO. Therefore, for all subsequent space signals width information corresponding to the quotient answer itself will be introduced to the memory stages of the electronic comparator.

At the completion of a line, as when the end of line signal (that is, the justification, quad left, quad right or centering signal, as the case may be) is decoded in the read head and a "line complete" relay is energized. Energization of this relay conditions the carriage returns pulse gate 140, as by pulsing it to one of its stable states wherein it increases the negative bias on the counter input triode 247 and so prevents the pulses from the grating pulse generating apparatus from being introduced to the counter during the return movement of the carriage. When the carriage reaches its starting position and before the first pulse is generated by the grating, the carriage return relay is deenergized. However, since gate 140 is a bi-stable multivibrator it temporarily remains in the state wherein it suppressed the grating pulses and prevented their introduction to the counter during the return movement of the carriage. However, when the very first pulse generated by the grating during the forward or line composing movement of the carriage is transmitted to first pulse eliminator 137, it in turn generates a pulse which is transmitted by way of conductor 138 to gate 140 and restores the gate to its normal or line composing condition. In being so restored, the gate produces a negative pulse which is transmitted to the counter output gate 142 and so in effect is a counter output pulse. It is only produced in response to the first grating pulse. Thereafter, and for the remainder of the line composing movement of the carriage, return pulse gate 140 will be conditioned to bias counter input 247 so that pulses from the grating will be transmitted to the counter. At the end of the line and for subsequent lines of composition, the functioning of pulse gate 140 will be as described.

*Start of line offset*

Reference is made to aforementioned application Serial Nos. 696,419 and 696,446 filed simultaneously herewith, wherein is shown the grating which is carried by the projection lens carriage and together with the photocell apparatus generates the pulses that are transmitted to the counter as a measure of carriage travel. The pulse generating feature of the grating was described hereinbefore, but attention is now directed to the physical aspects of the grating, particularly the location of the light slits.

The bottom pair of slits is used when the photographically recorded characters are 5 point; the next pair of slits for 5½ point characters; the next pair of slits for 6 point characters; the next pair of slits for 7 point characters, the next pair of slits for 8 point characters; and the next and last pair of slits for 9 point characters. It will be noted from Fig. 2 of the first referred to applications that the first slit of each pair which intersects the light beam when the grating is moved for line composition in the direction of the arrow (that is, the most rightward line of each pair) is progressively offset further to the right for the higher point size characters. The reason for the offset is to provide a constant left hand margin regardless of the point size character being recorded and the amount of offset is set forth in co-pending application Serial No. 432,757, filed May 27, 1954. It would follow, of course, that for still higher point sizes additional pairs of lines would ordinarily be provided and that these would be offset further to the right than those shown. However, since each pair of slits is used for photographing two point sizes as hereinabove described, it follows that the first slit, which initiates the line count in both cases, cannot properly position the first character of a 5 point line and the first character of a 10 point line along the same left hand margin.

In order to overcome this difficulty and to insure a constant left hand margin regardless of the point size of the photographed characters, the start of line offset circuitry (Fig. 9) is employed. The effect of this circuitry is to discard the first nine pulses when photographing the smaller point sizes, i.e. 5, 5½, 6, 7, 8 and 9. The number of pulses discarded is equal to one half the number of units in the typographical em, or since the present system presupposes an eighteen unit em, then nine pulses are discarded.

When a large point size, as above defined, is to be photographed, a "large point size" relay is energized and the contacts thereof condition the start of line offset gate bi-stable multivibrator 154 (Fig. 9) such that a low bias is placed on one control grid of the output pulse gate 156. Therefore, when the very first grating pulse produces an output pulse from the counter output gate 142 as above described, the pulse which is transmitted to the output pulse gate 156 is ineffective due to the low bias on one control grid of gate 156. Therefore, no pulse emanating from gate 156 is transferred to the remainder of the circuits as hereinbefore described. The counter output gate pulse is transmitted by conductor 151 to the start of line trigger 152. This component is a triode tube and a negative pulse produced thereby triggers the start of line offset monostable 153 which in turn triggers start of line offset gate 154 to its other stable state. In being so triggered, the plate of one tube of the bi-stable multivibrator of gate 154 jumps to a high voltage which immediately initiates conduction in the start of line offset input buffer amplifier 276. The negative pulse produced when amplifier 276 starts conducting directly pulses through conductor 277 (Fig. 10) to the memory input stages of the electronic comparator to store the "width" information "9" therein. Therefore, conductor 277 is connected to the binary one and the binary eight input leads to comparator 222.

Also, when gate 154 is triggered and the plate of one tube thereof jumps to a high voltage, the bias on the control grid of output pulse gate 156 is increased so that, thereafter, counter output pulses from the counter output gate 141 will be passed by gate 156 to the remaining circuits. Thereafter, circuit operations are as above described for the remainder of the line composition. When the line is completed, the start of line offset gate 154 is pulsed to its other stable state in readiness for the following line. If the next line is for a large point size, then gate 154 is conditioned as above noted. On the other hand, if the next line is for a small point size, then the gate will remain as it is and operations will continue as hereinabove described.

*Quadding and centering*

It remains to be described how the photographic unit using the apparatus of the present invention quads and centers type-composed lines. While these terms are generally well understood in the art, a brief definition thereof will be here included.

A line that is quadded may be quadded left or quadded right. In the first instance, the line will be disposed with the first character therein coincident with the left hand margin and each interword of normal spacing, so that a white or quads space is interposed between the last character and the right hand margin. A quadded right line, on the other hand, is disposed with the last character therein coincident with the right hand margin and the white space being interposed between the left hand margin and the first character in the line. Again, each of the interwords is of normal spacing. A centered line, of course, finds the line disposed midway, between the right and the left hand margins. In each of the particular line dispositions outlined, the interword spacing is of a fixed predetermined width, as distinguished from the expanded width of a justified word space.

The first condition which will now be considered is that of a quadded right line. The coded tape information which controls the photographing to provide a quadded right line is, of course, determined during composition of the line in the keyboard unit of the two-unit photocomposing machine. The mechanism by which the information is determined and the nature of its coding is disclosed in aforementioned application Serial No. 607,952.

As a line is being composed in the keyboard unit, a running count of the line remainder, that is, the difference between the justified line length and the length of the line composed, is maintained. If the line is to be justified, the line remainder is divided among the interword spaces and a justification answer obtained and coded. If the line is to be quadded right, the line remainder is coded as such. If the line is to be centered, the line remainder is divided in half and then coded. For lines that are to be quadded left, no answer code is required.

Suffice it to say now that quad right information is coded as ems and units-of-an-em. Furthermore the ems are coded as ems-tens and ems-units. For example if the line remainder answer is twenty-three ems and seventeen units-of-an-em, it is coded as two ems-tens, three ems-units, and seventeen units-of-an-em. As a further example if the line remainder is thirty-four ems and five units-of-an-em, the answer will be coded as three ems-tens, four ems-units and five units-of-an-em.

Turning now to the introduction of such information into the present apparatus, we will assume for purposes of illustration that the line remainder is twenty-three ems and seventeen units-of-an-em and that the line is to be quadded right. On the tape the answer signal is preceded by a quad right signal. Therefore, when the tape is in position just prior to photographing of the line to be quadded right, the quad right signal is in decoding position on the scan head and quad right decode relay QRD is energized in consequence thereof.

When the end of line signal for the preceding line reaches decoding position on read head 111, then the line to be quadded right is represented in signal form on that portion of the coded control tape between the two decoding heads. Since there is an end-of-line signal on both decoding heads, the tape is in position for coordinated movement over the decoding heads to properly photograph the line.

Energization of scan end of line relay SELD and read end-of-line relay RELD completes circuits to step each of stepping switches JST, QTST and QUST to their home position. These circuits are traced, respectively, through stepping switch coil JST, interrupter contact JST3, rectifier RJ, off home contact JST2 and contacts SELD1 and RELD3; stepping switch coil QTST, interrupter contact QTST3, rectifier RQT, off home contact QTST2 and contacts SELD1 and RELD3; and stepping switch coil QUST, interrupter contact QUST3, rectifier RQU, off home contact QUST2 and contacts SELD1 and RELD3. The action of each of these switches is as previously described for switch JST.

Furthermore, since the end-of-line signal in decoding position on the scan head is a quad right signal, a circuit will be completed for quad right relay coil QRD, the circuit being traced from line W1, through contacts 1SD1, 2SD1, 3SD1, 4SD1, 5SD1, 6SD1, 7SD1 and 8SD2 and coil QRD and contacts ELG1 and SP to line W2. Energization of coil QRD results in the engagement of contacts QRD1, QRD2 and QRD3, the first of which completes a self holding circuit for coil QRD while the contacts QRD2 complete a circuit for quad answer search relay coil QAS. Energization of coil QAS causes the engagement of contacts QAS5 which provide a self holding circuit for coil QAS, and contacts QAS3 and QAS6. Contacts QAS3 complete a circuit for quad ems-tens stepping switch coil QTST so that the stepping switch is actuated to search out the quad ems-tens answer. This is accomplished in the same manner that the quotient remainder answer was searched out and consequently it is not deemed necessary to give a description of the stepping switch operating details. And contacts QAS6 complete circuit for the quad ems-units stepping switch coil QUST so that the stepping switch is actuated to search out the quad ems-units answer.

When the movable brushes QTB1, QTB2, etc. reach the row of contacts, e.g. QTC1-2, QTC2-2, etc. representative of the quad ems-tens answer of two, a circuit is completed through contacts QAS1, brush QTB1, contacts QTC1-1 and QTC2-1, brush QTB2, contacts 3SD2, brush QTB3, contacts QTC3-2, brush QTB5 and rectifier RQT2 to short out coil QTST and arrest further stepping of switch QTST. In the example cited, the line remainder is twenty-three ems and seventeen units-of-an-em. Hence the quad ems-tens answer is two and brushes QTB1, QTB2, etc. will come to rest on contacts QTC1-2, QTC2-2, etc., or in other words, two positions from the home position.

In a similar manner, the quad ems units stepping switch QUST will be actuated to search out the quad ems units answer. Again, considering our example, the brushes QUB1, QUB2, etc. will advance until they reach the contacts QUC1-3, QUC2-3, etc. three positions away from home position whereupon all further advance is prevented.

The units-of-an-em remainder answer is stored in binary relays BS, BE, BF, BT and BO, so that in the example under consideration where the units-of-an-em answer is seventeen, relays BO and BS will be energized. With the quad right answer information decoded and stored in the apparatus as indicated, the composition of the line can be commenced.

When the projection lens carriage 70 travels in the forward direction, the grating 75 and photocell unit 76 generate pulses as hereinabove described. However, since the line is to be quadded right, a white or quad space will appear between the left hand margin and the first character in the line. Therefore, the quad right answer information, which is stored in the apparatus in the quad ems-tens and the quad ems-units stepping switches and the binary relays, must delay photography of the first character in the line until a distance or width corresponding to the answer is bypassed by the carriage after movement from its start of line position.

In order to abridge the present portion of the description, it will be assumed that the line is to be photographed in a large point size and consequently there need be no consideration of start of line offset. Of course, if these is to be a start line offset, as by photographing the characters in a small point size, the proper offset will be effected as hereinabove described.

The first pulse generated by the grating and photocell unit will produce a counter output pulse that performs the same functions as it did when the line to be photographed was a justified line. (See Fig. 9.) However, the width information gate 163 is now initially set so that it does not place an initial bias on the grids of the quadding trigger gate 165 and the character width trigger 166. This condition is maintained as long as there are quad units-of-an-em which have not been accounted for by carriage movement. Consequently, the pulse produced by output pulse monostable 161 and transmitted over conductor 162 does not energize either gate 165 or trigger 166. By virtue of the conditioning of width information gate 163, however, the quad unit remainder trigger 164, which is a triode tube, is fired and a negative pulse is transmitted over conductor 279 to the quadding data memory input 280. (See also Fig. 10.) The pulse is fed, through capacitors 281, 282, etc., to the grids of each of the quadding tubes 283, 284, etc. Ordinarily the pulse would be ineffective to fire the tubes but in the cathode circuit of each tube are normally separated contacts of the binary relays BO, BT, BF, etc. If the contacts are engaged as when the relays are energized, the pulse applied to the grids of the tubes will fire the tubes. The tubes (reading from top to bottom in Fig. 10) are assigned the binary values 1, 2, 3, 4, 8 and 16 so that the two tubes 283 and 284 shown (three identical circuits being omitted) have the binary values 1 and 16, respectively. It will be observed that the cathode circuit of tube 283 contains contacts BO3 of the binary one relay BO, while the cathode circuit of tube 284 contains contacts BS4 of the binary sixteen relay BS.

In the example under consideration the quads units-of-an-em remainder is seventeen and relays BO and BS are energized and contacts BO3 and BS4 engaged. Thus when the pulse is received over conductor 279, the quadding tubes 283 and 284 fire and transmit a negative pulse over conductors 180 and 181 respectively. These latter pulses are transmitted to the memory stages of the electronic comparator 222 (see Fig. 11) where they pulse the memory bi-stable multivibrators in accordance with the binary information to be stored. Actuation of the memory bi-stable multivibrators was hereinbefore described and a repetition thereof is not now needed. Suffice it to say that memory information corresponding to the quad units-of-an-em remainder are stored in the memory stages of the comparator. In the example under consideration this will be seventeen units.

Therefore when the pulse count generated by carriage grating pulse generator i.e. photocell unit 76 reaches seventeen there will be coincidence in comparator 222 and an output pulse will be generated. Prior to generation of this output pulse, the width information gate 163 is restored to its more normal condition wherein it places a bias on the first grids of quadding trigger gate 165 and character width trigger 166. Restoration of gate 165 to its presently assumed condition occurs in consequence of the quad units-of-an-em remainder being provided for in the line. There still remains the quadding ems to be accounted for. Turning now to quadding gate 165 and character trigger 166, it is sufficient to point out that contacts of relays QTH and QUH are provided in the cathode circuits of both triggers. Since the line is being quadded and the quad ems-tens stepping switch QTST and the quad ems units stepping switch QUST which searched out the quadding answer information have their brushes out of the home position, relays QTH and QUH will be deenergized. Normally engaged contacts from each relay are connected in parallel and provided in the quadding trigger gate cathode circuit to short out a cathode resistor and thereby increase the plate cathode voltage. This voltage difference plus the bias on the first grid of gate 165 conditions the tube so that it fires in response to the output pulse from monostable 161. The pulse thus generated by the firing of gate 165 is transmitted to the quadding input trigger 285 which is a monostable multivibrator. A positive pulse output therefrom is applied to the grids of the twin triodes which compose the quadding ems unit 286 and the grids of the twin triodes which compose the centering ems unit 287. Since the line is being quadded only, the triodes of quadding ems unit 286 are conditioned for firing in response to the pulse from trigger 285. The conditioning is effected by shorting out a cathode resistor thereby increasing the plate-cathode voltage.

The plates of the two triodes are connected by conductors 290 and 291 (Fig. 10) directly to the conductors leading to the memory multivibrators of comparator 222 having the binary values two and sixteen inasmuch as the present apparatus contemplates an eighteen unit em. Therefore, when the triodes fire, a pulse is transmitted to the memory stages of electronic comparator 222. The comparator thus has stored therein a memory count corresponding to the width of a typographic em.

At the same time that quadding information is being introduced to the comparator 222, the pulse from quadding trigger gate 165 is transmitted by conductor 292 to the quad stepper 293 which includes a monostable multivibrator and a relay which acts to engage contacts 296 (Fig. 7) and thereby step the quad ems units stepping switch QUST one position. In other words, if the brushes of switch QUST are in engagement with the contacts in the seventh position removed from the home position, the brushes will be stepped to engage the contacts in the sixth position.

The carriage 70 is, of course, travelling in the composition direction and the grating 75 carried thereby is generating pulses which are transmitted to the counter stages of comparator 222. When the count reaches eighteen, there is coincidence between the counter stages and the memory stages and a counter output pulse is generated. This output, again, transmits quadding information to the memory stages and a count of eighteen is again stored therein. At the same time, the quad stepper is energized to step quad ems units stepping switch one step nearer the home position. This operation is repeated both as to the introduction of quad information to comparator 222 and the energization of the quad stepper until brushes QUB1, etc. reach the home position, at which time a circuit is completed to energize coil QUH and engage contacts QUH1. Engagement of contacts QUH1 and 296a (the latter of which engage under the same conditions as causes contacts 296 to engage) completes a circuit to energize coil QTST and thereby step quad ems-tens stepping switch one position.

The next output pulse again steps brushes QUB1, etc. of the quad ems units stepping switch from the home position to the position nine steps removed from the home position. Of course what is taking place is that at each output pulse generated the quad ems remainder as stored on switches QTST and QUST is reduced one count. When the count is reduced to zero and the brushes of both stepping switches are in their home positions circuits are completed for the energization of relays QTH and QUH. This means that the carriage 70 has traversed a distance equal to the width of the quad spaces and that the apparatus can now begin to photograph the characters in the quadded line. The normally engaged contacts of relays QTH and QUH for the quad or character selection 300 (Fig. 9) which are in the cathode circuit of the quadding trigger gate 165 thereupon separate, while the normally separated contacts of said relays QTH and QUH located in the character width trigger 166 engage. Now trigger 166, rather than gate 165, is conditioned for firing in response to the pulse from the output pulse monostable 161, and the characters in the line will be photographed as hereinbefore described.

A line that is to be centered is photographed similarly to a quadded right line, in that photographing of the first character in the line is delayed until the carriage traverses a distance equal to the centering width. This width, or centering information, is stored on the coded control tape much in the manner that quad right information is stored. However, it is noted that the code for quad ems and quad units is the same for both a line to be quadded right and a line to be centered. For a centered line, the information is decoded as ens rather than ems, however. This is more fully explained in the aforementioned application Serial No. 607,952. The units-of-an-em remainder is coded in the form in which it is used or in other words the line remainder units-of-an-em is coded in the tape at a value one-half of the actual units-of-an-em remainder.

The quad ems-tens and quad ems-units answer is again searched out by stepping switches QTST and QUST, and the units-of-an-em remainder is stored in binary relays BO, BT, BF, etc. The first output pulse generated by travel of carriage introduces the units-of-an-em information to comparator 222 as above described. Thereafter, the centering information is transmitted to comparator 222 as ens rather than ems. Thus the pulse from quadding trigger 165 triggers the quads input monostable 285 which in turn pulses the grids of the quadding ems and centering ens units 236 and 287 as hereinabove described. However, since the line is to be centered only the triode tubes of centering ens unit 287 are fired. The plates of the two tubes are connected directly to the conductors leading to the memory stages of comparator 222 having the binary values one and eight. Thus, in a system having an eighteen unit em, ens, which have a width of one-half of an em, have a value of nine. It is thus seen that for centered lines the information introduced to the comparator is of a value one-half that which is introduced for quadded right lines.

With the difference as noted between lines that are centered and those that are quadded right, photographing of a centered line is effected in a manner corresponding to that described for a quadded right line. Hence, when in the claims reference is made to quad information, such reference is intended to apply either to a quad right operation or to a centering operation. It should be understood, therefore, that the terms "ems," "units of em" and "tens of ems," which literally apply in the case of a quad right operation, should be interpreted as "ens," "units of ens" and "tens of ens" as applied to a centering operation. However, it should be noted that the term "units of an em remainder" is used for both quad right and centering operations.

It will further be observed that for lines which are quadded right or quadded left or centered, relay QCR is energized and contacts QCR1, QCR2, QCR5, QCR6 and QCR7 are separated and contacts QCR3 and QCR4 are engaged. This insures that for such lines, when an interword space is to be provided and the width information therefor is to be transmitted to comparator 222, consequent to the receipt of a pulse over conductor 170, the width value for such interword space will be four units-of-an-em. Of course, a different normal value of an interword space could be used and this would only require an obvious different arrangement of relay QCR contacts.

Inasmuch as lines that are quadded left are photographed similarly to a justified line, that is, so far as photographing of the first character in the line is concerned, it is not deemed necessary to detail the operation of the apparatus for photographing of a quadded left line. Of course, the interword spaces in such a line are of normal width and not expanded as in a justified line. Therefore, relay QCR is energized for lines to be quadded left, thereby insuring that each interword space is of the predetermined normal width.

It is contemplated that many changes would be made to the preferred embodiment of this invention as above described, particularly with regard to the circuitry employed, without departing from the spirit and scope thereof, and therefore it is intended that all matter contained in the above description or shown in the accompanying drawings shall be interpreted as illustrative and not in a limiting sense.

What is claimed is:

1. A phototypographical machine comprising, in combination, means for feeding therethrough a coded tape having thereon a succession of code signals representative of a composed line, means for decoding the signals in the tape as it is fed through the machine, a font plate presenting an array of type characters varying in set widths on a unit basis, means for photographing different selected characters, one after another, for composition in line, a light sensitive film on which the characters are recorded in the order in which they are photographed, means for producing a relative movement between the light sensitive film and the photographic means for line composition, a unit measuring device for the line composing movement, means responsive to decoded character identification signals to control the selection of the type characters to be photographed, means responsive to decoded character width signals as well as to said unit measuring device for varying the time of photographic action for the successive characters being composed in accordance with unit variations in set widths of said characters, and means responsive to decoded word space signals as well as to said unit measuring device for determining the extent of the line composing movement for the successive word spaces in the line in accordance with the unit set width of said spaces, the aforesaid means for varying the time of photographic action for the successive characters as well as the means for determining the extent of the line composing movement for the successive word spaces comprising a memory storage unit wherein the width value for each selected character or word space as it is decoded is temporarily stored, a counter unit actuated by the unit measuring device for counting each unit of relative movement between the photographic position and the film as it is measured by said device, and a coincidence unit connected to and actuated by said memory storage unit and said counter unit to determine when there is coincidence between the count in said counter unit and the width value stored in said memory storage unit, said coincidence unit thereby controlling the photographic and word space action.

2. A phototypographical machine according to claim 1 wherein the line measuring device is a pulse generator and said counter unit is an electronic counter comprising a plurality of stages of bi-stable multivibrators arranged as a binary counter and which is responsive to pulses generated by said line measuring device.

3. A phototypographical machine according to claim 1 wherein said memory storage unit is actuated by pulses generated from the character and word space signals in the tape and comprises a plurality of stages of bi-stable multivibrators arranged as a binary counter.

4. A phototypographical machine according to claim 1 wherein said coincidence unit comprises a plurality of electron tube stages one for each stage of said counter and said memory storage units, each such electron tube stage including a pair of parallel connected electron tubes capable of detecting coincidence between said counter and memory storage units.

5. A phototypographical machine according to claim 1 wherein said counter unit is an electronic counter comprising a plurality of stages of bi-stable multivibrators arranged as a binary counter, wherein said memory storage unit comprises a plurality of stages of bi-stable multivibrators arranged as a binary counter, and wherein said coincidence unit comprises a plurality of electron tube stages capable of detecting coincidence between said counter unit and said memory storage unit, each such electron tube stage including a pair of parallel connected electron tubes, each stage of each said counter and memory storage units being connected such that a grid of one electron tube of a coincidence stage is connected to a multivibrator of an associated stage of the counter and a grid of the other electron tube of the coincidence stage is connected to a multivibrator of an associated stage of the memory storage unit and thereby enabling the coincidence unit to be actuated by an identical count in the counter unit and the memory storage unit.

6. A phototypographical machine according to claim 5 wherein, in the zero count zero memory storage state, the grid of said one electron tube of the coincidence unit is connected to the plate of the conducting tube of said counter unit multivibrator and the grid of said other electron tube of the coincidence unit is connected to the plate of the non-conducting tube of said memory storage unit multivibrator whereby said other electron tube will be conducting.

7. A phototypographical machine according to claim 6 wherein the plates of the parallel connected electron tubes of each coincidence unit stage are connected through a voltage network to the grid of a coincidence detector electron tube for coincidence detection in any of the stages.

8. A phototypographical machine according to claim 7 wherein when at least one electron tube in each coincidence unit stage is conducting, indicating a difference in the count in either the counter or memory storage units, the coincidence detector electron tube will be biased off but, when both electron tubes in at least one coincidence unit stage are non-conducting, indicating coincidence the coincidence detector electron tube will be biased for conduction and thereby indicate coincidence in the counter and memory storage units.

9. A phototypographical machine according to claim 5 including pulse circuitry actuated by the tape decoding means and connected to each multivibrator of the counter unit stages and each multivibrator of the memory stages whereby in response to a voltage pulse the counter is restored to a zero count state and the memory storage unit is restored to a zero memory state.

10. A phototypographical machine according to claim 5 including a pulse generator for generating a voltage pulse for each unit distance of relative movement between the photographic position and the light sensitive film, and circuitry connecting said generator to said counter unit whereby for each unit distance of relative movement a pulse is transmitted to said counter unit for controlling the photographic and word space action.

11. A phototypographical machine according to claim 9 wherein the pulse circuitry actuated by the tape decoding means for restoring the counter unit stages and the memory storage unit stages to the zero count and zero memory states, respectively, is responsive to and actuated by conduction in the coincidence detector electron tube.

12. A phototypographical machine according to claim 5 including width memory circuits actuated by the tape decoding means for introducing width information to the memory storage unit multivibrators for continuous line composition.

13. A phototypographical machine according to claim 12 wherein said width memory circuits for storing width memory information for introduction into the memory storage unit multivibrator stage includes an electron tube, the plate of which is connected to the plate of the non-conducting tube of the memory storage unit multivibrator when the latter is in the zero memory state.

14. A phototypographical machine according to claim 13 wherein the width memory circuit electron tubes are preconditioned for conduction by a circuit element actuated by the decoding means in accordance with character width information contained on said tape.

15. A phototypographical machine according to claim 14 including pulse circuitry that is actuated by the tape decoding means and that is responsive to and actuated by conduction in the coincidence detector electron tube indicating coincidence in the count, and thereby actuate said pulse circuitry to cause conduction in a width memory circuit electron tubes that are also preconditioned for conduction by a circuit element actuated by the tape decoding means.

16. A phototypographical machine according to claim 13 wherein the width memory electron tubes are preconditioned for conduction by circuit elements that are actuated by the tape decoding means to feed thereto justified word space information.

17. A phototypographical machine according to claim 16 including pulse circuitry that is responsive to and actuated by coincidence in the coincidence detector electron tube and thereby cause conduction in a width memory circuit electron tube that has already been preconditioned for conduction by said circuit elements for introduction into said width memory circuits justified word space information for storage and release to the memory storage unit as needed.

18. A phototypographical machine according to claim 16 including a plurality of relays that are selectively operable in response to a justification signal supplied by the tape decoding means, the contacts of which constitute the selective circuit elements that precondition said width memory circuit electron tubes for conduction thereby storing said justified word space information therein.

19. A phototypographical machine according to claim 18 wherein one of said plurality of relays is selectively operable only when there is a quotient remainder and the remaining relays are selectively operable to represent the justification quotient, thereby temporarily storing the justified word space information for introduction into the width memory circuits.

20. A phototypographical machine according to claim 19 including a stepping switch for controlling the deenergization of said one relay and wherein said stepping switch upon decoding of a justification signal on the tape is initially set to a selected position depending on the number of word spaces that are to be of one justification width and therefore is advanced one position for each word space in a line of composition as it is composed word by word so that, when it reaches a reference position indicating no more word spaces remaining, it controls the deenergization of the aforesaid one of said relays.

21. A phototypographical machine according to claim 20 wherein deenergization of the aforesaid one of said relays results in the width memory circuit electron tubes being preconditioned to introduce into the memory storage unit multivibrators information for all word spaces in the type line to be provided subsequent to the deenergization of the aforesaid one of said relays said information being a width value one unit less than that introduced for all preceding word spaces in the type line and thus resulting in a fully justified line.

22. A phototypographical machine according to claim 17 wherein the pulse circuitry for introducing width information into the width memory storage unit includes delay means so that said width information is introduced and accepted only after said memory storage unit is reset to a zero memory state.

23. A phototypographical machine according to claim 20 including pulse circuitry responsive to conduction in the coincidence detector electron tube thereby indicating coincidence and to a word space signal from the tape decoding means for advancing said stepping switch one position toward the reference position, thereby supplying a justified word space.

24. A phototypographical machine according to claim 1 including a light source for illuminating a character to be recorded on the light sensitive film, and pulse circuitry for controlling the illumination of said light source in response to and actuated by conduction in said coincidence detector electron tube whenever a character signal occurs on the tape and is stored in said memory storage unit.

25. A phototypographical machine according to claim 24 including means for suppressing illumination of said light source when said coincidence detector electron tube conducts when word space information is stored in said memory storage unit.

26. A phototypographical machine according to claim 1 including means actuated by the tape decoding means for storing quad information, said means consisting of quad memory circuits for introducing said stored quad information to the memory storage unit multivibrators for quadding a line of composition.

27. A phototypographical machine according to claim 26 wherein said quadding information contained on the tape and is decoded therefrom by said decoding means and is stored as ems and units of an em remainder.

28. A phototypographical machine according to claim 27 wherein the quadding information as decoded from said tape is stored as ems in stepping switches and as units of an em remainder in relays.

29. A phototypographical machine according to claim 28 wherein the ems information is stored as tens of ems and units of ems and a first stepping switch is provided to store tens of ems quadding information and a second stepping switch is provided to store units of ems quadding information.

30. A phototypographical machine according to claim 29 including pulse circuitry actuated by the decoding means and connected to each multivibrator of the counter unit stages and each multivibrator of the memory storage unit stages whereby in response to a suitable voltage pulse the counter unit is restored to a zero count state and the memory storage unit is restored to a zero memory state, a pulse generator for generating a voltage pulse for each unit distance of relative movement between the photographic position and the light sensitive film, suitable circuitry connecting said generator to said counter whereby for each unit distance of relative movement a pulse is generated and transmitted to said counter, and wherein the plates of the parallel connected electron tubes of each coincidence unit stages are connected through a voltage network to the grid of a coincidence detector electron tube that is biased for conduction when there is coincidence between the count in the counter unit and the width memory in the memory storage unit thereby accurately controlling all character and word space widths for proper line composition.

31. A phototypographical machine according to claim 30 including pulse circuitry responsive to and actuated by conduction in the coincidence detector electron tube for restoring the counter unit stages and the memory storage unit stages to the zero count and zero memory states, respectively, thereby preparing the units for the next character or word space information.

32. A phototypographical machine according to claim 31 wherein said quad memory circuits for storing and introducing quad units of an em remainder include for each memory storage unit multivibrator stage an electron tube, the plate of which is connected to the plate of the non-conducting tube of the memory storage unit multivibrator when the latter is in the zero memory state and thereby introduce units of an em remainder into said memory storage unit for quadding.

33. A phototypographical machine according to claim 32 wherein each width memory electron tube is preconditioned for conduction by a contact of a relay that stores quad units of an em remainder information and thereby stores the quadding information.

34. A phototypographical machine according to claim 33 including pulse circuitry that is responsive to and actuated by conduction in the coincidence detector electron tube for causing conduction in a width memory circuit electron tube that is preconditioned for conduction by a contact of a quad units of an em remainder information storage relay and thereby pulse the memory storage unit multivibrator and condition the memory storage unit in accordance with the units of an em remainder information and thereby store the quadding information.

35. A phototypographical machine according to claim 34 including means responsive to the storing of quad units of an em remainder information in the memory storage unit for preconditioning pulse circuitry that will thereby store ems information in the memory storage unit.

36. A phototypographical machine according to claim 35, wherein the quad memory circuits for introducing quad ems information to the memory storage unit multivibrator stages include electron tubes connected to the plates of the non-conducting tubes of the memory storage unit multivibrators and thereby introduce information that represent a width memory equivalent to an em for storage therein when the latter are in the zero memory state.

37. A phototypographical machine according to claim 36 including pulse circuitry responsive to and actuated by conduction in the coincidence detector electron tube so that when the count coincides with the quad units of an em remainder the em input circuitry is energized to introduce and store in the memory storage unit width information equivalent to one em for quadding.

38. A phototypographical machine according to claim 37 including means responsive to and actuated by conduction in the coincidence detector electron tube so that when the count in the memory storage unit coincides with the quad units of an em remainder the units of an em stepping switch will be stepped one position towards a reference position.

39. A phototypographical machine according to claim 38 including means responsive to and actuated by the units of ems stepping switch reaching its reference position for stepping the tens of ems stepping switch one position towards a reference position.

40. A phototypographical machine according to claim 39 including means responsive to and actuated by both the units of ems stepping switch and the tens of ems stepping switch reaching their reference positions, respectively, for conditioning a circuit element so that conduction indicating coincidence in the coincidence detector electron tube that thereafter takes place will result in the release for introduction into and storage in the memory storage unit of character width information.

41. A phototypographical machine according to claim 35, wherein the quad memory circuits for introducing quad ems and centering ens information to the memory storage unit multivibrator include electron tubes connected to the plates of the non-conducting tubes of the stages of the memory storage unit multivibrators and thereby introduce information for quadding and centering that represent a width memory equivalent to an em when the latter are in the zero memory state and electron tubes connected to the plates of the non-conducting tubes of the memory storage unit multivibrators and thereby introduce information for quadding and centering that represent a width memory equivalent to an en when the latter are in the zero memory state.

42. A phototypographical machine comprising, in combination, means for feeding therethrough a coded tape having thereon a succession of code signals representative of a composed line, means for decoding the signals in the tape as it is fed through the machine, a font plate presenting an array of type characters varying in set widths on a unit basis, means for photographing different selected characters, one after another, for composition in line, a light sensitive film on which the characters are recorded in the order in which they are photographed, means for producing a relative movement between the light sensitive film and the photographic means for line composition, a unit measuring device for the line composing movement, means responsive to decoded character identification signals to control the selection of the type characters to be photographed, means responsive to decoded character width signals as well as to said unit measuring device for varying the time of photographic action for the successive characters being composed in accordance with unit variations in set widths of said characters, means responsive to decoded word space signals as well as to said unit measuring device for determining the extent of the line composing movement for the successive word spaces in the line in accordance with the unit set width of said spaces, means for decoding quad right and line remainder signals in the coded tape, and means responsive to a decoded quad right signal and a decoded line remainder signal as well as to said unit measuring device for delaying the photographic action until the distance travelled by the line composing movement equals the number of units of width making up the line remainder.

43. A phototypographical machine according to claim 42, wherein the line remainder signal in the coded tape comprises at least two parts, namely, an ems signal and a units of an em signal, and wherein both signals are decoded by said decoding means and used in controlling the quad right operation.

44. A phototypographical machine according to claim 42, wherein the line remainder signal in the coded tape comprises three parts, namely, an ems-tens signal, an ems units signal, and a units of an em signal, and wherein all three signals are decoded by said decoding means and used in controlling the quad-right operation.

45. A phototypographical machine comprising, in combination, means for feeding therethrough a coded tape having thereon a succession of code signals representative of a composed line, means for decoding the signals in the tape as it is fed through the machine, a font plate presenting an array of type characters varying in set widths on a unit basis, means for photographing different selected characters, one after another, for composition in line, a light sensitive film on which the characters are recorded in the order in which they are photographed, means for producing a relative movement between the light sensitive film and the photographic means for line composition, a unit measuring device for the line composing movement, means responsive to decoded character identification signals to control the selection of the type characters to be photographed, means responsive to decoded character width signals as well as to said unit measuring device for varying the time of photographic action for the successive characters being composed in accordance with unit variations in set widths of said characters, means responsive to decoded word space signals as well as to said unit measuring device for determining the extent of the line composing movement for the successive word spaces in the line in accordance with the unit set width of said spaces, means for decoding centering and line remainder signals in the coded tape, and means responsive to a decoded centering signal and a decoded line remainder signal as well as to said unit measuring device for delaying the photographic action until the distance travelled by the line composing movement equals one-half the number of units of width making up the line remainder.

46. A phototypographical machine according to claim 45, wherein the line remainder signal in the coded tape comprises at least two parts, namely, an ens signal and a units of an em signal, and wherein both signals are decoded by said decoding means and used in controlling the centering operation.

47. A phototypographical machine according to claim 45, wherein the line remainder signal in the coded tape comprises three parts, namely, an ens-tens signal, an ens units signal, and a units of an em signal, and wherein all three signals are decoded by said decoding means and used in controlling the centering operation.

48. A phototypographical machine comprising, in combination, means for feeding therethrough a coded tape having thereon a succession of code signals representative of a composed line, means for decoding the signals in the tape as it is fed through the machine, a font plate presenting an array of type characters varying in set widths on a unit basis, means for photographing different selected characters, one after another, for composition in line, a light sensitive film on which the characters are recorded in the order in which they are photographed, means for producing a relative movement between the light sensitive film and the photographic means for line composition, a unit measuring device for the line composing movement, means responsive to decoded character identification signals to control the selection of the type characters to be photographed, means responsive to decoded character width signals as well as to said unit measuring device for varying the time of photographic action for the successive characters being composed in accordance with unit variations in set widths of said characters, means responsive to decoded word space signals as well as to said unit measuring device for determining the extent of the line composing movement for the successive word spaces in the line in accordance with the unit set width of said spaces, means for decoding quad right, centering and line remainder signals in the coded tape, and means responsive either to a decoded quad right signal or to a decoded centering signal and a decoded line remainder signal as well as to said unit measuring device for delaying the photographic action until the distance travelled by the line composing movement equals the number of units of width making up the line remainder or one-half the number of said units according to whether the composed line is to be quadded right or centered.

49. A phototypographical machine according to claim 48, wherein the line remainder signal comprises at least two parts, namely an ems signal and a units of an em signal for quadding right, or an ens signal and a units of an em signal for centering.

50. A phototypographical machine according to claim 48, wherein the line remainder signal comprises three parts, namely, either an ems-tens signal, an ems unit signal and a units of an em signal for quadding right, or an ens-tens signal, an ens units signal and a units of an em signal for centering.

51. A phototypographical machine according to claim 48, wherein the means for delaying the photographic action are common to the decoded line remainder signals associated with either a decoded quad right signal or a decoded centering signal.

52. A phototypographical machine according to claim 45, including means responsive to a decoded end of line signal in the coded tape for arresting the line composing movement after the last character in the composed line has been photographed regardless of the position of said characters in the composed line.

53. A phototypographical machine according to claim 42, wherein the means for delaying the photographic action include an electronic storage device in which the decoded line remainder signal is stored and an electronic counter which counts the number of units of width making up the line remainder as measured by the unit measuring device during the line composing movement.

54. A phototypographical machine according to claim 45, wherein the means for delaying the photographic action include an electronic storage device in which the decoded line remainder signal is stored and an electronic counter which counts the number of units making up the line remainder as measured by the unit measuring device during the line composing movement.

55. A phototypographical machine according to claim 42, wherein the unit measuring device comprises a photocell, a light source therefor, and an intermediate grating partaking of the line composing movement and serving to activate the photocell after each unit distance of travel of the line composing movement.

56. A phototypographical machine comprising, in combination, means for feeding therethrough a coded tape having thereon a succession of code signals representative of a composed line, means for decoding the signals in the tape as it is fed through the machine, a font plate presenting an array of type characters varying in set widths on a unit basis, means for photographing different selected characters, one after another, for composition in line, a light sensitive film on which the characters are recorded in the order in which they are photographed, means for producing a relative movement between the light sensitive film and the photographic means for line composition, means responsive to decoded character identification signals to control the selection of the type characters to be photographed, means responsive to decoded character width signals for varying the time of photographic action for the successive characters being composed in accordance with unit variations in set widths of said character, means responsive to decoded word space signals for determining the extent of line composing movement for the successive word spaces in the line in accordance with the unit set width of said spaces, means for decoding quad right and the line remainder signals in the coded tape, and means responsive to a decoded quad right signal and a decoded line remainder signal for delaying the photographic action until the distance travelled by the line composing movement equals the number of units of width making up the line remainder.

57. A phototypographical machine comprising, in combination, means for feeding therethrough a coded tape having thereon a succession of code signals representative of a composed line, means for decoding the signals in the tape as it is fed through the machine, a font plate presenting an array of type characters varying in set widths on a unit basis, means for photographing different selected characters, one after another, for composition in line, a light sensitive film on which the characters are recorded in the order in which they are photographed, means for producing a relative movement between the light sensitive film and the photographic means for line composition, means responsive to decoded character identification signals to control the selection of the type characters to be photographed, means responsive to decoded character width signals for varying the time of photographic action for the successive characters being composed in accordance with unit variations in set widths of said character, means responsive to decoded word space signals for determining the extent of line composing movement for the successive word spaces in the line in accordance with the unit set width of said spaces, means for decoding centering and line remainder signals in the coded tape, and means responsive to a decoded centering signal and a decoded line remainder signal for delaying the photographic action until the distance travelled by the line composing movement equals one-half the number of units of width making up the line remainder.

58. In a coded tape operated phototypographical machine in which there is a relative line composing movement between the sensitized surface on which the text matter is photographed and the means for projecting character images, each of said character images having a characteristic width which is a multiple of a unit space, said unit space being a predetermined part of a given typographical em and in which said line composing movement is measured to control the photographing of successive character images, the combination of an opaque grating partaking of the line composing movement and having a series of successively acting translucent slits spaced apart at a distance proportional to the aforesaid unit space, a photocell unit pulsed by a light beam passing through said slits during the line composing movement of the grating, an electronic circuit energized by the pulsing of the photocell unit and controlling the photographic action in accordance with unit variations in set widths of the character images successively composed, electronic means for transmitting to the electronic circuit each successive pulse of the photocell unit or every other pulse thereof according to the point size of the character images being composed, and means responsive to a signal in the coded tape for suppressing a given number of the initial pulses from the photocell unit when the electrical transmitting means function to transmit each successive pulse of the photocell to the electrical circuit when character images of the smaller point size are being composed.

References Cited in the file of this patent

UNITED STATES PATENTS

| | | |
|---|---|---|
| 2,714,842 | Hooven | Aug. 9, 1955 |
| 2,714,843 | Hooven | Aug. 9, 1955 |
| 2,769,379 | Peery | Nov. 6, 1956 |
| 2,786,400 | Peery | Mar. 26, 1957 |
| 2,787,654 | Peery | Apr. 2, 1957 |
| 2,826,973 | Freund | Mar. 18, 1958 |

UNITED STATES PATENT OFFICE

CERTIFICATE OF CORRECTION

Patent No. 2,923,215　　　　　　　　　　　　　　February 2, 1960

Victor M. Corrado et al.

It is hereby certified that error appears in the printed specification of the above numbered patent requiring correction and that the said Letters Patent should read as corrected below.

Column 2, line 9, for "next" read -- text --; column 8, line 25, for "alignement" read -- alignment --; column 11, line 11, for "Engagements" read -- Engagement --; column 16, line 32, for "311" read -- 211 --; column 18, line 68, for "postive" read -- positive --; column 20, line 14, for "transmited" read -- transmitted --; line 21, for "Width" read -- With --; column 21, line 68, for "silt" read -- slit --; column 22, line 15, for "dischard" read -- discard --; column 24, line 62, for "these" read -- there --; column 25, line 15, strike out the numeral "3"; column 29, line 22, after "memory" insert -- storage unit --; column 31, line 2, after "information" insert -- is --; column 34, line 41, for "characters" read -- character --; column 35, line 9, strike out "the", first occurrence.

Signed and sealed this 9th day of August 1960.

(SEAL)
Attest:

KARL H. AXLINE　　　　　　　　　　　　　　　　ROBERT C. WATSON
Attesting Officer　　　　　　　　　　　　　　Commissioner of Patents